(12) United States Patent
Hayakawa

(10) Patent No.: US 8,804,978 B2
(45) Date of Patent: Aug. 12, 2014

(54) MICROPHONE DIRECTIVITY CONTROL APPARATUS

(75) Inventor: Shoji Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 12/965,227

(22) Filed: Dec. 10, 2010

(65) Prior Publication Data

US 2011/0158425 A1 Jun. 30, 2011

(30) Foreign Application Priority Data

Dec. 25, 2009 (JP) ................. 2009-295188

(51) Int. Cl.
| | | |
|---|---|---|
| *H04R 1/02* | (2006.01) | |
| *G01S 3/808* | (2006.01) | |
| *H04M 1/60* | (2006.01) | |
| *H04R 3/00* | (2006.01) | |
| *A61F 11/06* | (2006.01) | |
| *H04M 1/02* | (2006.01) | |
| *H04R 1/40* | (2006.01) | |

(52) U.S. Cl.
CPC .............. *H04R 3/005* (2013.01); *G01S 3/8083* (2013.01); *H04R 2430/01* (2013.01); *H04R 2499/11* (2013.01); *H04M 1/6008* (2013.01); *H04M 2250/12* (2013.01); *H04R 2460/07* (2013.01); *H04M 1/0281* (2013.01); *H04R 1/406* (2013.01)
USPC ........................................... 381/92; 381/71.1

(58) Field of Classification Search
USPC .............. 381/92, 71.1; 455/66.1, 575.1, 91.1, 455/566, 351
See application file for complete search history.

(56) References Cited

U.S. PATENT DOCUMENTS

| | | | | |
|---|---|---|---|---|
| RE40,116 | E * | 2/2008 | Engstrom | 455/66.1 |
| 7,561,700 | B1 * | 7/2009 | Bernardi et al. | 381/92 |
| 8,121,310 | B2 * | 2/2012 | Amada | 381/92 |
| 8,155,345 | B2 * | 4/2012 | Tagawa et al. | 381/92 |
| 2002/0064287 | A1 | 5/2002 | Kawamura et al. | |
| 2009/0116652 | A1 * | 5/2009 | Kirkeby et al. | 381/1 |
| 2010/0056227 | A1 * | 3/2010 | Hayakawa et al. | 455/570 |

FOREIGN PATENT DOCUMENTS

| | | | |
|---|---|---|---|
| JP | 2002-204493 | | 7/2002 |
| JP | 2008-042754 | | 2/2008 |
| JP | 2008-167323 | | 7/2008 |
| JP | 2008167323 | A * | 7/2008 |

* cited by examiner

*Primary Examiner* — Vivian Chin
*Assistant Examiner* — Ammar Hamid
(74) *Attorney, Agent, or Firm* — Staas & Halsey LLP

(57) ABSTRACT

A directivity control apparatus is capable of acquiring tilt information indicating a tilt angle of the directivity control apparatus; acquiring sound source direction information; storing mapping data indicating a relationship between the tilt angle and the direction; determining whether the sound information indicates a target sound; updating the mapping data based on the sound source direction information and the tilt information, if the sound information indicates the target sound; estimating a direction of sound responsive to the tilt information, based on the mapping data if the sound information doesn't indicate a target sound; and adjusting a directivity of a microphone based on the sound source direction information if the sound information indicates the target sound, or adjusting the directivity of the microphone based on the estimated direction if the sound information doesn't indicate the target sound.

18 Claims, 18 Drawing Sheets

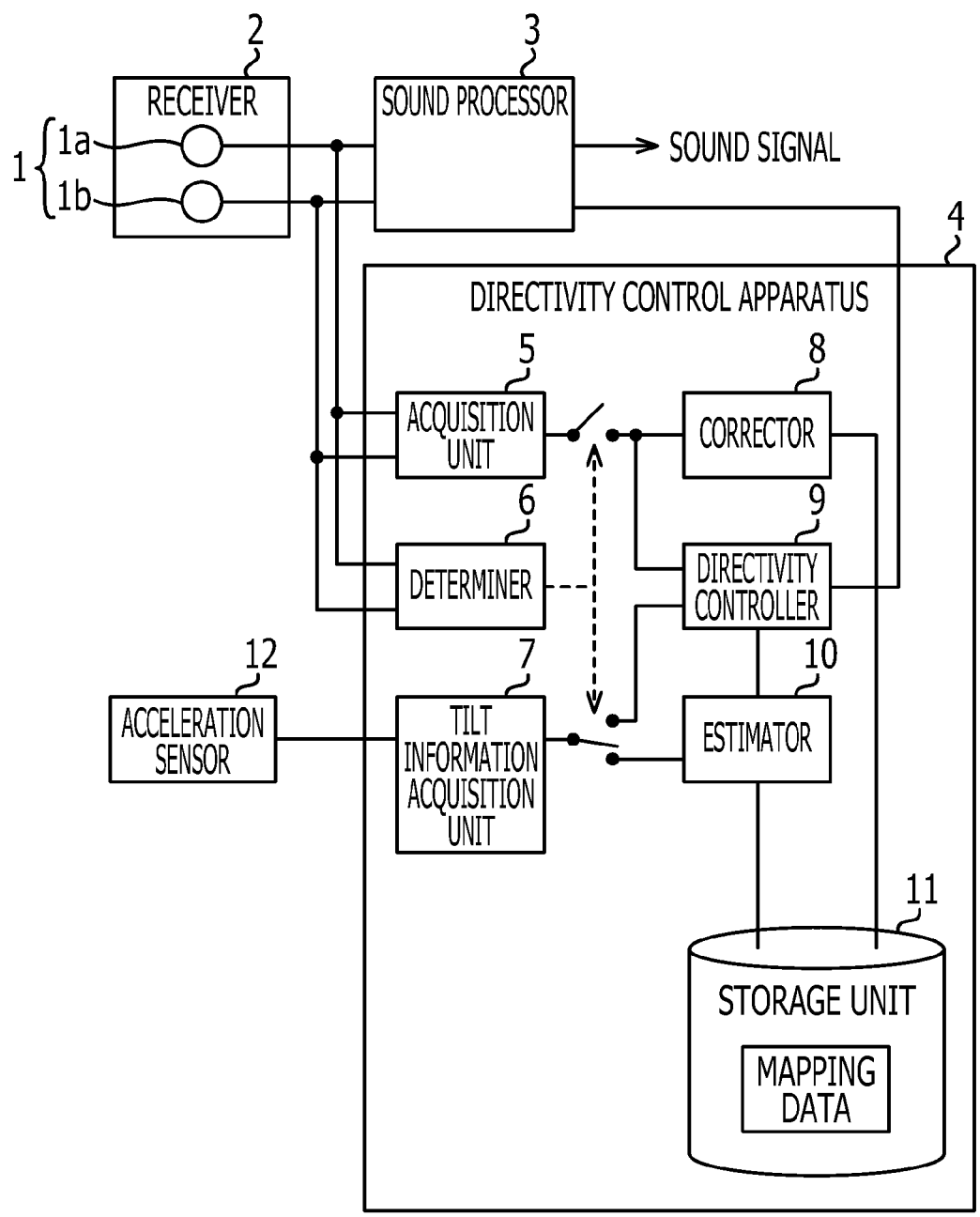

FIG. 10A
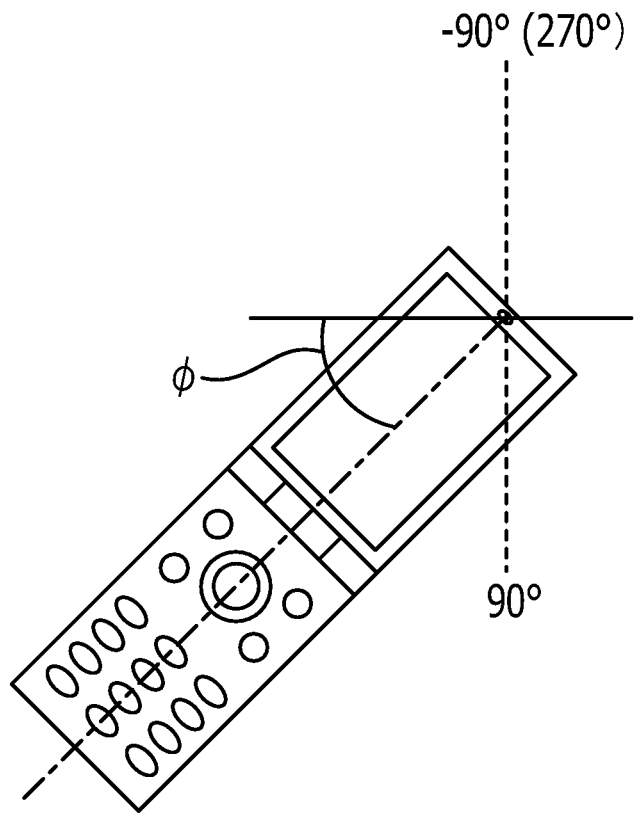
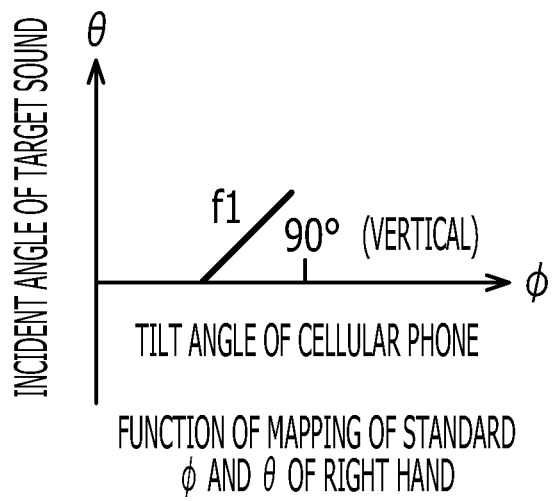
FUNCTION OF MAPPING OF STANDARD
φ AND θ OF RIGHT HAND FIG. 10B
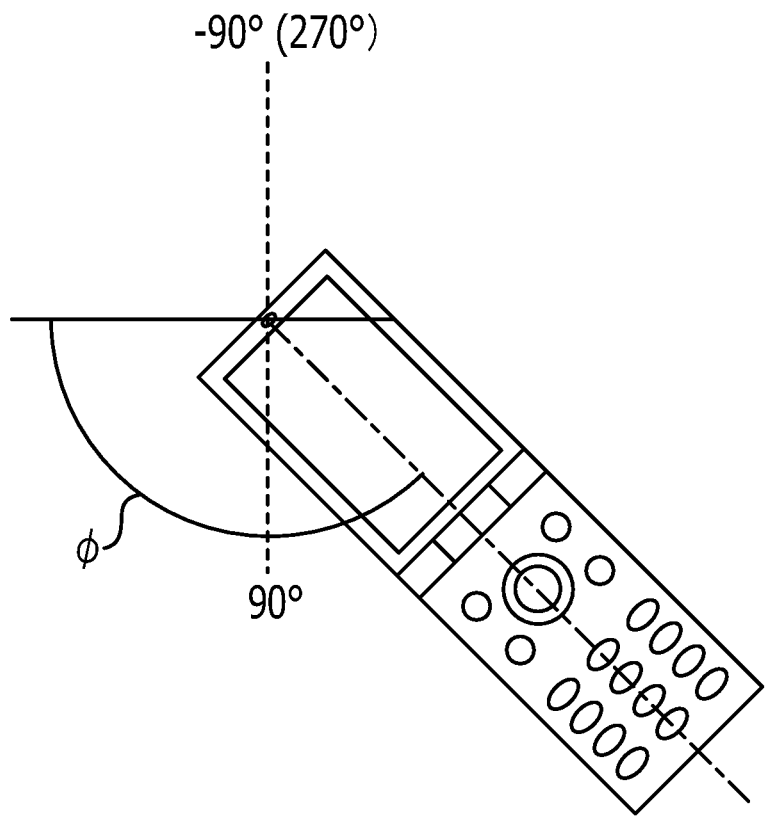
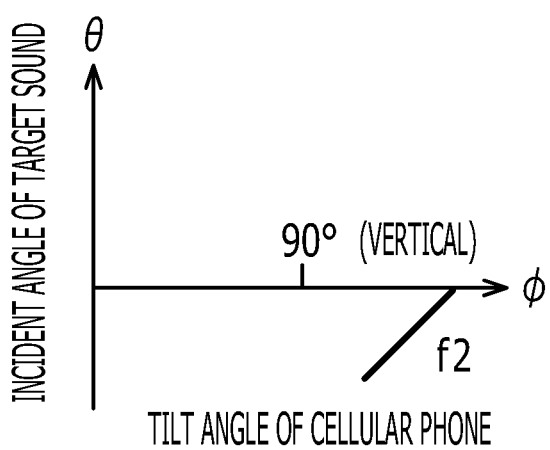
FUNCTION OF MAPPING OF STANDARD
φ AND θ OF LEFT HAND

MICROPHONE DIRECTIVITY CONTROL APPARATUS

CROSS-REFERENCE TO RELATED APPLICATIONS

This application is based upon and claims the benefit of priority of the prior Japanese Patent Application No. 2009-295188, filed on Dec. 25, 2009, the entire contents of which are incorporated herein by reference.

FIELD

Various embodiments described herein relate to a directivity control technique of a microphone.

BACKGROUND

Japanese Laid-open Patent Publication No. 2002-204493 discusses a technique of picking up a target sound with a microphone with the target sound emphasized. According to the technique, a directivity of the microphone is controlled to restrict a background noise. For example, by narrowing a directivity of a microphone array, a noise reduction quantity is increased. However, if a relative positional relationship between a sound source of a target sound and a microphone changes during sound pickup, the sound source may be off-aligned with the directivity of the microphone, and the target sound may be suppressed.

For example, the directivity of a microphone array may be narrowed on the microphone array mounted on a cellular phone. If a user holds a cellular phone at a tilt angle, the microphone array may face from the mouth of a user and the level of a sound picked up by the microphone array may be suppressed. If the user talks while walking, the positional relationship between the mouth and the microphone array is not stabilized, and the position of the mouth falls out of the directivity of the microphone array. The sound level is thus suppressed.

In a method of controlling the directivity of the microphone, a direction to the mouth, i.e., a sound source is estimated based on a sound signal picked up by the microphone array in order to control the directivity of the microphone array. This method provides a low detection accuracy of the sound source direction if signal to noise rate (SNR) is low. Japanese Laid-open Patent Publication No. 2008-167323 discusses a method of correcting a directivity of a microphone. In the method, a directivity correction value of the microphone is stored with a tilt angle of a cellular phone having the microphone mounted thereon mapped thereto on a database. By referencing the database, the directivity is corrected in response to the tilt angle of the cellular phone detected by a tilt sensor.

SUMMARY

According to an aspect of the invention, a directivity control apparatus is capable of acquiring tilt information indicating a tilt angle of the directivity control apparatus; acquiring sound source direction information; storing mapping data indicating a relationship between the tilt angle and the direction; determining whether the sound information indicates a target sound; updating the mapping data based on the sound source direction information and the tilt information, if the sound information indicates the target sound; estimating a direction of sound responsive to the tilt information, based on the mapping data if the sound information doesn't indicate the target sound; and adjusting a directivity of a microphone based on the sound source direction information if the sound information indicates the target sound, or adjusting the directivity of the microphone based on the estimated direction if the sound information doesn't indicate the target sound.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a functional block diagram of an example of a directivity control apparatus of a first embodiment;

FIG. 10A is an example of the tilt angle of the cellular phone held by the right hand of a user and the mapping data of the tilt angle;

FIG. 10B is an example of the tilt angle of the cellular phone held by the left hand of the user and the mapping data of the tilt angle;

DETAILED DESCRIPTION OF EMBODIMENTS

Figure 2A:
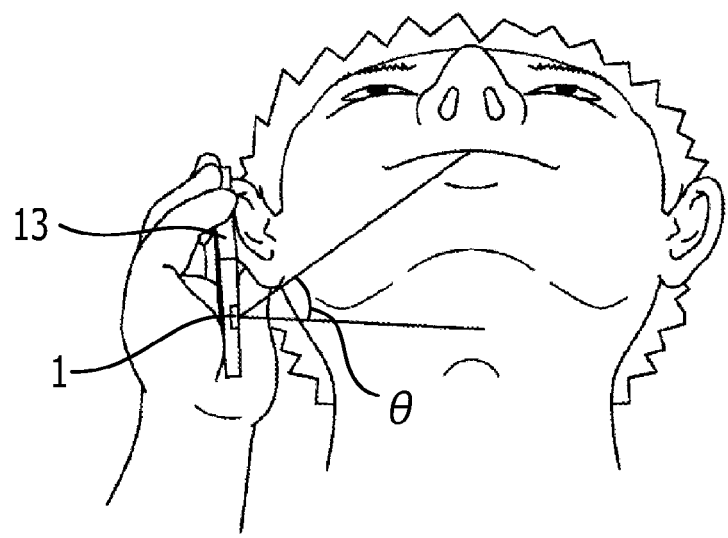
FIG. 2A is a user talking over a cellular phone and viewed from below.

Reference will now be made in detail to the embodiments, examples of which are illustrated in the accompanying drawings, wherein like reference numerals refer to the like elements throughout. The embodiments are described below to explain the present invention by referring to the figures.

The related art does not estimate a direction to a sound source if a user does not speak any voice. According to Japanese Laid-open Patent Publication No. 2008-167323, a directivity correction value is determined based on a lookup table that maps a tilt angle of a cellular phone terminal to the directivity correction value. However, for example, if a user talking over a cellular phone looks slightly up or down, or is lying flat, a sound source from the user's mouth would become out of alignment.

FIG. 1 is a functional block diagram of a directivity control apparatus 4 of a first embodiment. The directivity control apparatus 4 may be arranged on a cellular phone having a microphone. The directivity control apparatus 4 of FIG. 1 is a computer that acquires information related to a direction to a sound source of a sound received by the microphone array having directionality, and a tilt angle of the casing of the cellular phone, i.e., the tilt of the microphone, and controls the directivity of the microphone based on these pieces of information.

The directivity control apparatus 4 of FIG. 1 receives a sound signal received by a receiver 2, and outputs a directivity control signal to a sound processor 3. In response to the directivity control signal, the sound processor 3 processes the sound signal received by the receiver 2 and outputs a sound signal with noise thereof suppressed.

The receiver 2 is a microphone array 1 including a plurality of microphones 1a and 1b. If the receiver 2 is mounted on the cellular phone, the microphones 1a and 1b may be arranged side by side in the front of the cellular phone. Alternatively, one microphone may be arranged in the front of the cellular phone and the other microphone may be arranged on the rear side of the cellular phone.

The receiver 2 is not limited to the one illustrated in FIG. 1. For example, the receiver 2 may include three or more microphones. Alternatively, the receiver 2 includes an amplifier, an analog-to-digital converter, a delay circuit, or any other functional unit in addition to the microphone.

The directivity control apparatus 4 includes acquisition unit 5, determiner 6, tilt information acquisition unit 7, corrector 8, directivity controller 9, estimator 10, and storage unit 11. The functions of these elements may be implemented in an electronic circuit or a recording medium or may be implemented in a specific program that is executed by a processor. The program for causing a computer to execute the functions of the acquisition unit 5, the determiner 6, the tilt information acquisition unit 7, the corrector 8, the directivity controller 9, and the estimator 10 and the recording medium storing the program fall within the scope of the embodiments of the invention.

The acquisition unit 5 acquires sound source direction information indicating a direction to a sound source of a sound detected by the microphones 1a and 1b (the microphone array 1). The acquisition unit 5 may calculate the direction to the sound source based on sound information detected by the microphone array 1. The sound source direction may be a direction to a sound source with respect to the microphone array 1. The sound source localization technique based on a microphone array may be employed to calculate the sound source direction.

Figure 2B:
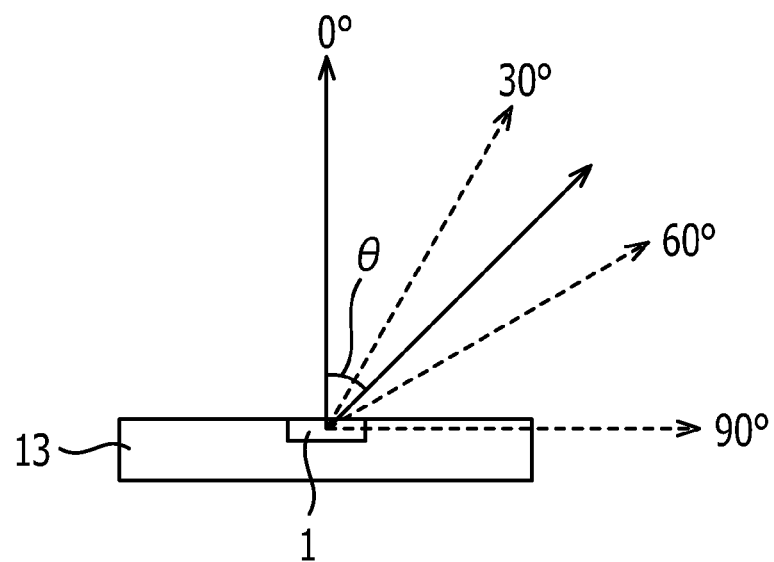
FIG. 2B is the casing of the cellular phone viewed from below.

According to the first embodiment, the sound source direction may be represented by an incident angle $\theta$ that is made by a line connecting the sound source and the microphone array 1 and a line normal to a plane in which the microphones 1a and 1b are arranged. FIG. 2A illustrates a user talking over a cellular phone and viewed from below. FIG. 2B is a bottom view of a casing 13 of the cellular phone. In an example of FIGS. 2A and 2B, the microphone array 1 is mounted on the bottom surface of the casing 13 of the cellular phone. The incident angle $\theta$ is made by a line normal to the plane in which the microphones 1a and 1b are arranged, and a line connecting the mouth of the user to the microphones 1a and 1b of the microphone array 1. The incident angle $\theta$ illustrated in FIGS. 2A and 2B is an example of a parameter representing the sound source direction, and a manner of representing the sound source direction is not limited to this method.

The tilt information acquisition unit 7 acquires tilt information indicating a tilt angle of the casing of the device having the microphones 1a and 1b thereon. For example, the tilt information acquisition unit 7 acquires, from the acceleration sensor 12 connected to the device main body having the microphones 1a and 1b, the tilt angle of the device, i.e., information indicating the tilt angle of the microphones 1a and 1b. If a sensor detecting the tilt angle and microphones are arranged on one casing, the tilt angle of the casing is acquired from the sensor mounted on the casing and measuring the tilt angle of the casing. The tilt angle of the casing is then used as a tilt angle of the microphones 1a and 1b later.

The acceleration sensor 12 is an example of a sensor detecting a motion of the microphones 1a and 1b. For example, the acceleration sensor 12 may include a three-axis acceleration sensor. An angular velocity sensor (gyro sensor) may be substituted for the acceleration sensor 12. Alternatively, the acceleration sensor 12 and the angular velocity sensor may be used in combination.

The tilt information acquisition unit 7 may convert information of acceleration (gravity) acquired from the acceleration sensor 12 into information indicating the tilt angle or may receive information indicating the tilt angle from the acceleration sensor 12. In the first embodiment, the tilt information acquisition unit 7 acquires as tilt information an tilt angle $\phi$ made by the center line of the cellular phone and a horizontal plane.

Figure 3:
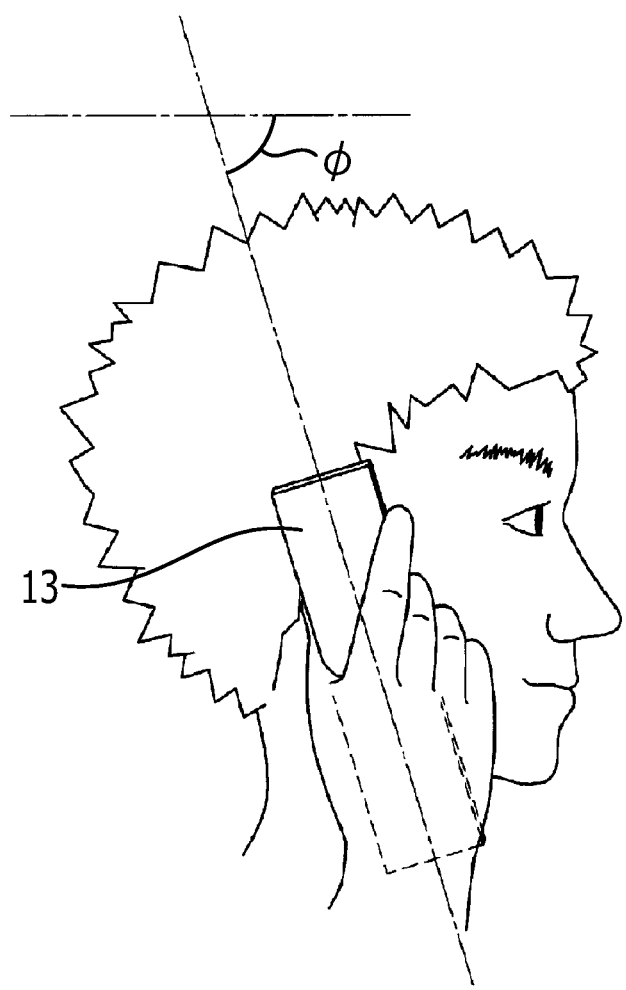
FIG. 3 is a diagram illustrating an example of the tilt angle.

FIG. 3 illustrates a user holding the cellular phone and talking over the cellular phone, viewed from the side. As illustrated in FIG. 3, the tilt angle $\phi$ is made by the center line of a casing 13 of a sound processor 3, for example, a center line of a cellular phone, and a horizontal plane. The tilt angle $\phi$ of FIG. 3 is one example of a parameter representing the tilt angle of the cellular phone or the microphones 1a and 1b, and the manner of representing the tilt angle is not limited to this method. For example, an angle made by a line connecting the microphone array 1 and a loudspeaker and a horizontal plane may be set to be a tilt angle.

The storage unit 11 is a storage medium storing mapping data. The mapping data maps the tilt angle $\phi$ as the tilt angle of the microphones 1a and 1b to the incident angle $\theta$ as the direction to the sound source with respect to the microphones 1a and 1b. The storage unit 11 may store a table that maps a value of the tilt angle to a value representing the direction to the sound source. Alternatively, the storage unit 11 may store a function that converts the value representing the tilt angle into the value representing the direction to the sound source.

The determiner 6 determines whether the microphones 1a and 1b have detected a target sound. For example, the determiner 6 determines whether the target sound has been detected or not by determining whether a sound signal input from the microphone array 1 is a voice or other sound sources. Generally, the presence or absence of the target sound is determined by determining whether the level of the sound signal received from the microphone array 1 is above a threshold value. Any known voiced frame detection technique may be used. The presence or absence of the target sound may be determined based on the sound source direction information acquired by the acquisition unit 5 and the tilt information acquired by the tilt information acquisition unit 7.

If the determiner 6 determines that the target sound has been detected, the corrector 8 updates the mapping data based on the sound source direction information acquired by the acquisition unit 5 and/or the tilt information acquired by the tilt information acquisition unit 7.

If the determiner 6 determines that no target sound has been detected, and/or that a background noise level is high, the estimator 10 estimates the direction to the sound source responsive to the tilt information acquired the tilt information acquisition unit 7, based on the mapping data.

The directivity controller 9 adjusts the directivity of the microphones 1a and 1b based on the sound source direction information acquired by the acquisition unit 5 and/or the sound source direction determined by the estimator 10. More specifically, if it is determined that the sound information acquired by the microphones 1a and 1b indicates the target sound, the directivity controller 9 adjusts the directivity of the microphones 1a and 1b based on the sound source direction information acquired by the acquisition unit 5. If it is determined that the sound information acquired by the microphones 1a and 1b does not indicate the target sound, the directivity controller 9 adjusts the directivity of the microphones 1a and 1b based on the sound source direction estimated by the estimator 10.

The directivity controller 9 acquires the incident angle $\theta$ as information representing the sound source direction from one of the acquisition unit 5 and the estimator 10, or both. The directivity controller 9 notifies the sound processor 3 of the incident angle $\theta$ and causes the sound processor 3 to output a sound signal having directivity characteristics of the incident angle $\theta$. For example, the sound processor 3 may perform signal processing such that the sensitivity characteristics of the microphone array 1 has a peak in the direction of the incident angle $\theta$. In other words, the sound processor 3 may selectively extract a sound incident on the microphone array 1 at an angle smaller than the incident angle $\theta$ and then outputs the extracted sound. The inputting of a signal of a sound incident at an angle larger than the incident angle $\theta$ is thus suppressed as noise.

If a target sound is detected, the directivity control apparatus 4 updates the mapping data based on the sound source direction information of the target sound actually detected, and/or the tilt information of the casing. The directivity control apparatus 4 thus corrects the mapping data such that the mapping data between the tilt angle of the casing and the sound source direction becomes close to actual data. The directivity is thus adjusted based on the sound source direction of the target sound and the tilt angle actually detected. If the target sound is not detected, the estimator 10 estimates the sound source direction responsive to the tilt information based on the corrected mapping data. If the target sound is detected, the mapping indicated by the mapping data between the tilt angle and the sound source direction is corrected to be close to the actual mapping. If the target sound is not detected, the sound source direction is estimated based on the mapping data. As a result, the directivity control apparatus 4 performs appropriate directivity control process in a manner such that it is less likely that the target sound source is off alignment even when the target sound is not detected.

The function of the directivity control apparatus 4 mounted on the cellular phone is described below. The determiner 6 first determines the presence or absence of a voice. If the determiner 6 determines that a voice is detected, the directivity controller 9 controls the directivity based on the direction $\theta$ to the mouth acquired by the acquisition unit 5. The corrector 8 matches coordinate values of the current tilt angle $\phi$ of the cellular phone from the acceleration sensor 12 and coordinate values of the current sound source direction from the acquisition unit 5, i.e., the incident angle $\theta$ to the mouth. If the determiner 6 determines that no voice is detected, i.e., the user does not speak any voice, the directivity control apparatus 4 estimates the current incident angle $\theta_S$ to the mouth, based on the information of the current tilt angle $\phi$ of the cellular phone from the acceleration sensor 12 and the mapping data between the tilt angle and the target sound source incident angle stored on the storage unit 11. The directivity controller 9 then controls directivity based on the estimated incident angle $\theta_S$.

The estimator 10 and the directivity controller 9 may operate in a process different from the process described above in response to a change in the tilt angle of the microphones 1a and 1b. For example, if the determiner 6 determines that no target sound has been detected, and the tilt angle of the microphones 1a and 1b has been increased to a larger value, the estimator 10 determines the sound source direction responsive to the tilt information based on the mapping data. The directivity controller 9 thus controls directivity such that the signal of the sound in the determined sound source direction is selectively extracted.

If the determiner 6 determines that no target sound has been detected, and the tilt angle of the microphones 1a and 1b has been decreased to a smaller value, the corrector 8 may correct the mapping data in response to a change in the tilt angle. One of the estimator 10 and the directivity controller 9 may operate in a process different from the process described above in response to a change in the tilt angle of the microphones 1a and 1b. The directivity control process is thus improved.

Figure 4:
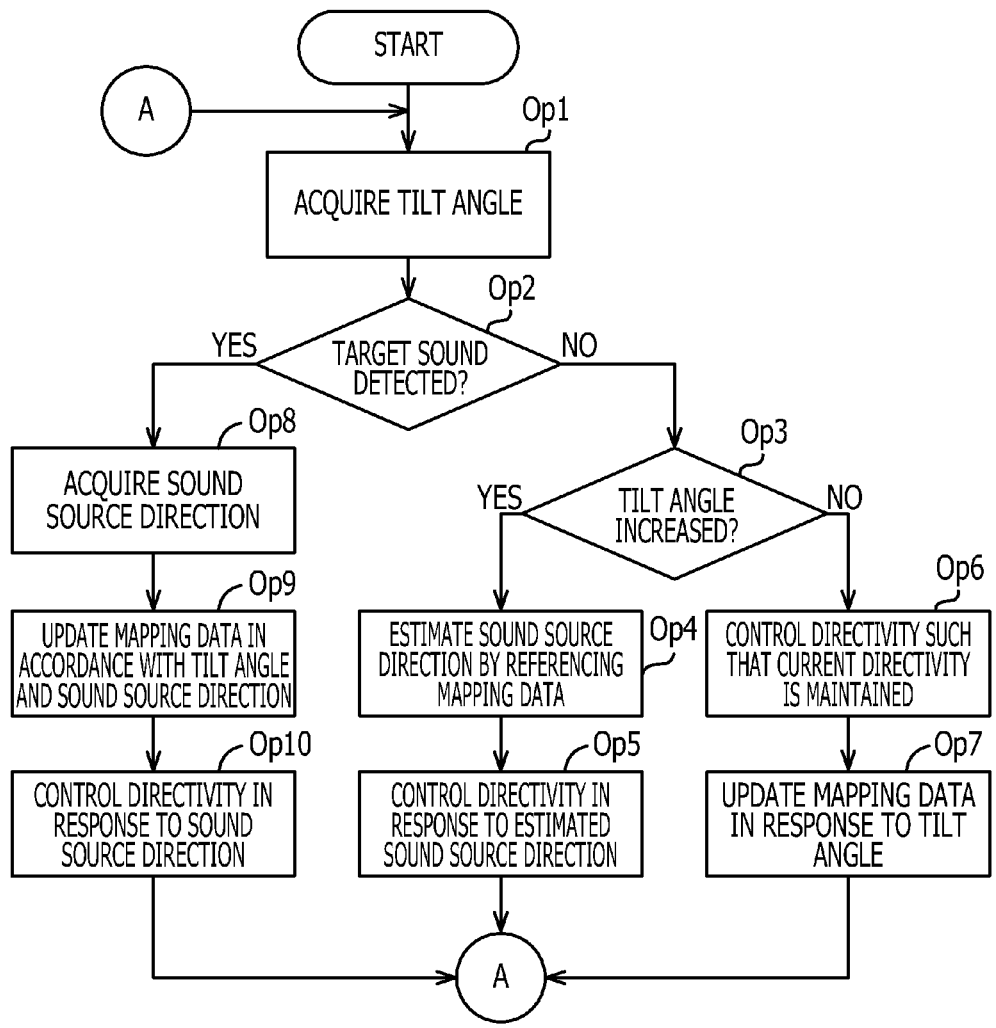
FIG. 4 is a flowchart illustrating an example of a directivity control process of the directivity control apparatus.

An example of the directivity control process of the directivity control apparatus 4 is described below. FIG. 4 is a flowchart illustrating the example of the directivity control process of the directivity control apparatus 4. The directivity control apparatus 4 is here mounted on the cellular phone. The tilt information acquisition unit 7 acquires a tilt angle $\phi_1$ from the acceleration sensor 12 (Operation 1). The determiner 6 determines whether a target sound has been detected from the signal input from the microphones 1a and 1b (Operation 2). For example, the target sound is a voice spoken by the user, and the determiner 6 determines whether the user has spoken a voice or not.

[Process Example (Operation 8 to Operation 10) with the User Speaking]

If the user speaks (yes from Operation 2), the acquisition unit 5 calculates an incident angle $\theta_1$ from the signal input from the microphones 1a and 1b (Operation 8). The acquisition unit 5 notifies the corrector 8 of the incident angle $\theta_1$. The acquisition unit 5 also notifies the directivity controller 9 of the incident angle $\theta_1$ as the current sound source direction (direction to the mouth).

The corrector 8 corrects the mapping data on the storage unit 11 in accordance with the mapping between the current tilt angle $\phi_1$ of the cellular phone and the incident angle $\theta_1$ of the voice from the mouth (Operation 9). A correction process of the mapping data is described in detail below.

The directivity controller 9 notifies the sound processor 3 of the incident angle $\theta_1$ of the voice, and the sound processor 3 controls the directivity of the microphone array 1 in response to the incident angle $\theta_1$ (Operation 10). For example, the sound processor 3 extracts selectively a signal of a sound input to the microphone array 1 at the incident angle $\theta_1$. More specifically, the sound processor 3 suppresses as a noise a signal of a sound incident on the microphone array 1 at an angle out of the incident angle $\theta_1$. For example, signals of sounds incident at an angle of $\theta_L$ on a plurality of microphones regularly arranged in a line may be set to be in-phase by delay units respectively arranged at the microphones such that the signals incident at the angle $\theta_L$ are enhanced.

Figure 5A:
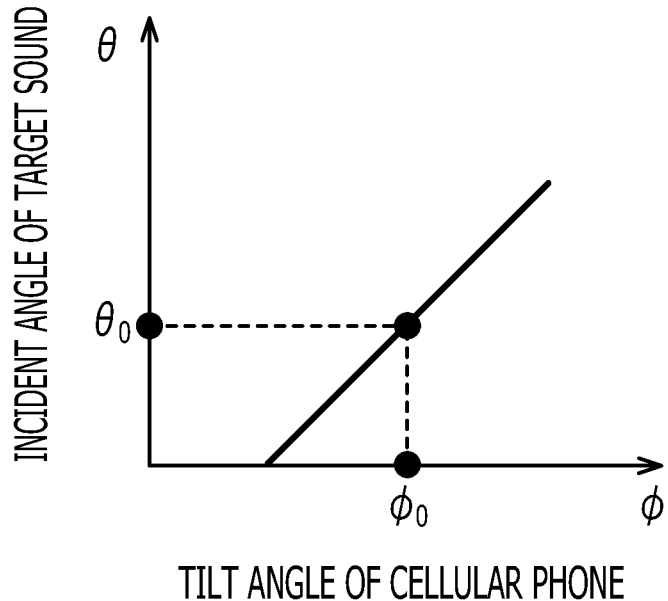
FIG. 5A is a diagram illustrating an example of mapping between an incident angle θ of a sound and a tilt angle of the cellular phone represented by mapping data.

A specific example of Operation 9 is described below. FIG. 5A illustrates a mapping relationship represented in the mapping data between the incident angle $\theta$ of the target sound (user's voice) and the current tilt angle $\phi$ of the cellular phone. As illustrated in FIG. 5A, the incident angle $\theta$ of the target sound is expressed by a linear function of the tilt angle $\phi$ of the cellular phone. For example, coefficients A and B of a linear function $\theta=A\phi+B$ representing the mapping may be stored as the mapping data on the storage unit 11. Referring to FIGS. 5A-5D, the ordinate represents the incident angle $\theta$ of the target sound and the abscissa represents the tilt angle $\phi$ of the cellular phone.

Figure 5B:
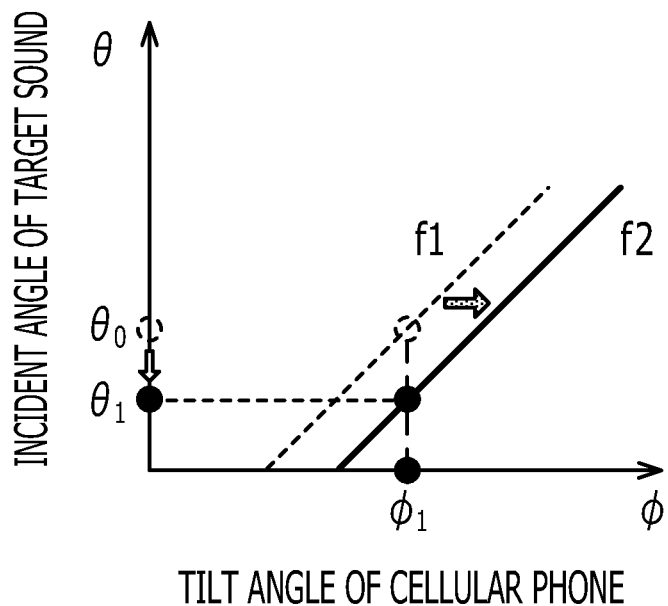
FIG. 5B is a diagram illustrating a correction example of the mapping data.

In Operation 9, the corrector 8 may correct the coefficient B such that a combination of a current incident angle $\theta_1$ of the sound and a current tilt angle $\phi_1$ of the cellular phone satisfies the linear function $\theta=A\phi+B$. More specifically, as illustrated in FIG. 5B, the coefficient B may be corrected such that the linear function $\theta=A\phi+B$ passes through a point $(\theta_1,\phi_1)$ in a $\phi\theta$ plane. In this case, the function representing the mapping between $\phi$ and $\theta$ is translated in parallel in the $\phi\theta$ plane. As illustrated in FIG. 5B, a straight line f1 represents mapping prior to the correction, and a straight line f2 represents mapping subsequent to the correction.

The user may now change their position, for example, from a sitting position to a lying flat position while talking over the cellular phone. The position change of the user causes a change in the relationship between the incident angle $\theta$ as the direction to the mouth (sound source) with reference to the microphones 1a and 1b and the tilt angle $\phi$ of the cellular phone. The user position change may change the incident angle from $\theta_0$ to $\theta_1$. As illustrated in FIG. 5B, the corrector 8 may correct the coefficient B such that the mapping changes from the straight line f1 to the straight line f2. While the user speaks a voice, the mapping between the tilt angle of the cellular phone and the incident angle of the sound from the mouth is updated in response to the user position.

[Process Example (Operation 3 to Operation 7) with the User not Speaking]

If the determiner 6 determines that the user does not speak (no from Operation 2), the estimator 10 estimates an incident angle $\theta_{S1}$ from the current tilt angle $\phi_1$ of the cellular phone acquired by the tilt information acquisition unit 7 based on the mapping data representing the mapping between the tilt angle of the cellular phone and the incident angle to the mouth (Operation 4). In Operation 9, the mapping between $\phi$ and $\theta$ represented in the mapping data is continuously corrected in response to the user position while the user speaks a voice. Even if the user moves their face or lies flat during speaking, a change in the mapping between $\phi$ and $\theta$ caused by a change in the user position is accounted for in the mapping data. Even when the user does not speak, the direction to the mouth (incident angle $\theta_{S1}$) may be estimated in response to a change in the user position.

If the user does not speak as illustrated in FIG. 4, the process becomes different depending on whether the tilt angle $\phi$ of the cellular phone increased (yes from Operation 3) or decreased (no from Operation 3).

If the user does not speak and if the tilt angle $\phi$ of the cellular phone is increased (no from Operation 2 and yes from Operation 3), the estimator 10 references the mapping data and estimates the sound source direction (incident angle $\theta_{S1}$) responsive to the current tilt angle $\phi_1$ of the cellular phone.

Figure 5C:
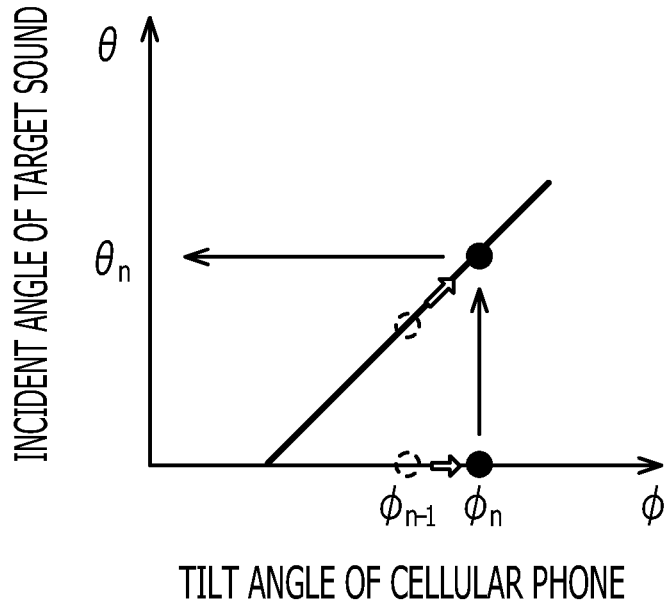
FIG. 5C is a diagram illustrating a sound source direction estimation process performed based on the mapping data.

The tilt information acquisition unit 7 periodically acquires the tilt angle $\phi$ at regular intervals, and notifies the estimator 10 of a tilt angle $\phi_1$ if the tilt angle $\phi_1$ larger than the tilt angle $\phi_0$ ($\phi_0<\phi_1$) acquired at the preceding acquisition is acquired. In this case, the estimator 10 substitutes the tilt angle $\phi_1$ for the tilt angle $\phi$ in the linear function $\theta=A\phi+B$, and then determines the incident angle $\theta_{S1}=A\phi_1+B$ responsive to the tilt angle $\phi_1$ as illustrated in FIG. 5C.

The directivity controller 9 controls the directivity of the microphones 1a and 1b in response to the estimated the incident angle $\theta_{S1}$. For example, the directivity controller 9 performs a control process, selectively extracting a signal of a sound incident at an angle smaller than the incident angle $\theta_{S1}$ and deselecting as noise a signal of a sound incident at an angle larger than the incident angle $\theta_{S1}$. If the incident angle $\theta_{S1}$ as an estimated value increases, an incident angle of a sound detected by the microphones 1a and 1b widens, and the directivity thus widens. If the tilt angle of the cellular phone is increased ($\phi_0 \rightarrow \phi_1$) with the user not speaking, it is likely that the incident angle of the sound to the microphones 1a and 1b increases. The estimator 10 calculates the incident angle $\theta_{S1}$ such that the tilt angle $\phi_1$ increases in response to the mapping data. The directivity thus widens.

If the tilt angle $\phi$ of the cellular phone is decreased (no from Operation 2 and no from Operation 3), the directivity controller 9 performs the control process such that the current directivity is maintained rather than being narrowed (Operation 6). If the tilt angle $\phi$ of the cellular phone is decreased, it is likely that the cellular phone has also been moved together with the motion of the face of the user. More specifically, if the tilt angle $\phi$ is decreased, a change in a relative positional relationship between the mouth as the sound source and the microphones 1a and 1b is typically small. For this reason, a change in the directivity of the microphones 1a and 1b may be reduced or eliminated. This arrangement prevents the directivity from being reduced too much and the target sound from being faded regardless of no change in the direction to the sound source (mouth) with respect to the microphones 1a and 1b.

The tilt information acquisition unit 7 periodically acquires the tilt angle $\phi$ at regular intervals. Upon acquiring a tilt angle $\phi_1$ smaller than the tilt angle $\phi_0$ acquired at the preceding acquisition ($\phi_0 > \phi_1$), the tilt information acquisition unit 7 notifies the directivity controller 9 of the tilt angle $\phi_1$. If the directivity is narrowed, the voice may be suppressed. For this reason, the directivity controller 9 maintains the current directivity (Operation 6).

The corrector 8 corrects a function of the mapping in response to the current tilt angle $\phi_1$ (Operation 7). If the tilt angle $\phi_1$ is smaller than a previously acquired tilt angle $\phi_0$, the relative positional relationship of the sound source to the microphones 1a and 1b may be regarded as unchanged. In other words, the incident angle $\theta$ may be regarded unchanged from a previously acquired $\theta_0$. The corrector 8 then may correct the mapping data based on the previously acquired incident angle $\theta_0$ and the currently acquired tilt angle $\phi_1$.

Figure 5D:
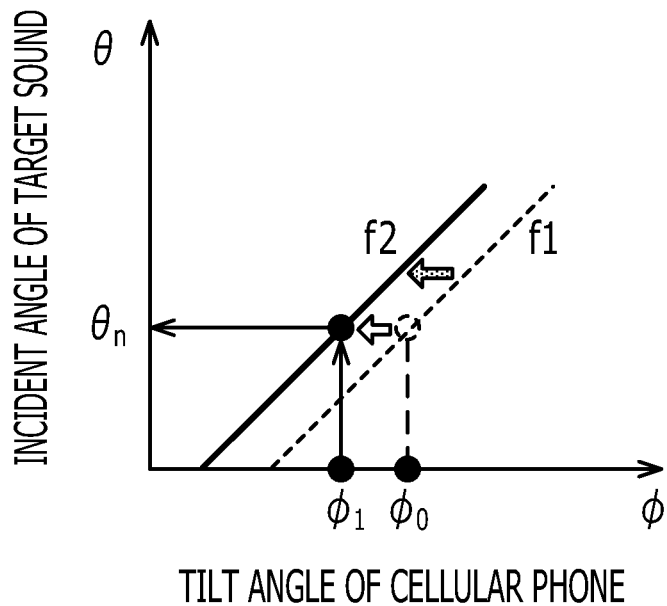
FIG. 5D is a diagram illustrating a correction process of the mapping data.

FIG. 5D illustrates a specific example of a straight line $\theta=A\phi+B$ represented by the mapping data and corrected by the corrector 8. As illustrated in FIG. 5D, the corrector 8 corrects B such that the straight line $\theta=A\phi+B$ passes through a point $(\theta_0,\phi_1)$. A straight line f1 represents mapping prior to the correction and a straight line f2 represents mapping subsequent to the correction in FIG. 5D. An appropriate incident angle $\theta_S$ matching the position of the user may be estimated by correcting the mapping data.

In the process example of FIG. 4, the function of the mapping between the incident angle $\theta_1$ of the target sound source and the tilt angle $\phi 1$, represented by the mapping data, may be corrected while the user speaks. If the user does not speak, the incident angle $\theta_S$ of the target sound source may be estimated based on the function of the mapping data. The control process is thus performed in order to keep the directivity of the microphone array 1 within the sound source direction. The process of the directivity control apparatus 4 is not limited to the one described above. For example, Operations 6 and 7 may be omitted in FIG. 4. Furthermore, Operations 3, 6 and 7 or Operations 3, 4, and 5 may be omitted in FIG. 4.

According to the first embodiment, the corrector 8 updates the relationship between the direction to the mouth and the tilt angle of the cellular phone while the user speaks. Even while the user does not speak, the direction to the mouth may be estimated from the information of the tilt angle of the cellular phone. The user may continue talking with the direction to the mouth maintained to within the directivity of the microphone array. By integrating the information of the tilt angle of the casing and the information of the sound source direction, the direction to the mouth as a target sound source may be reliably maintained within the range of the directivity, and the suppressing of the voice is thus avoided.

Figure 6:
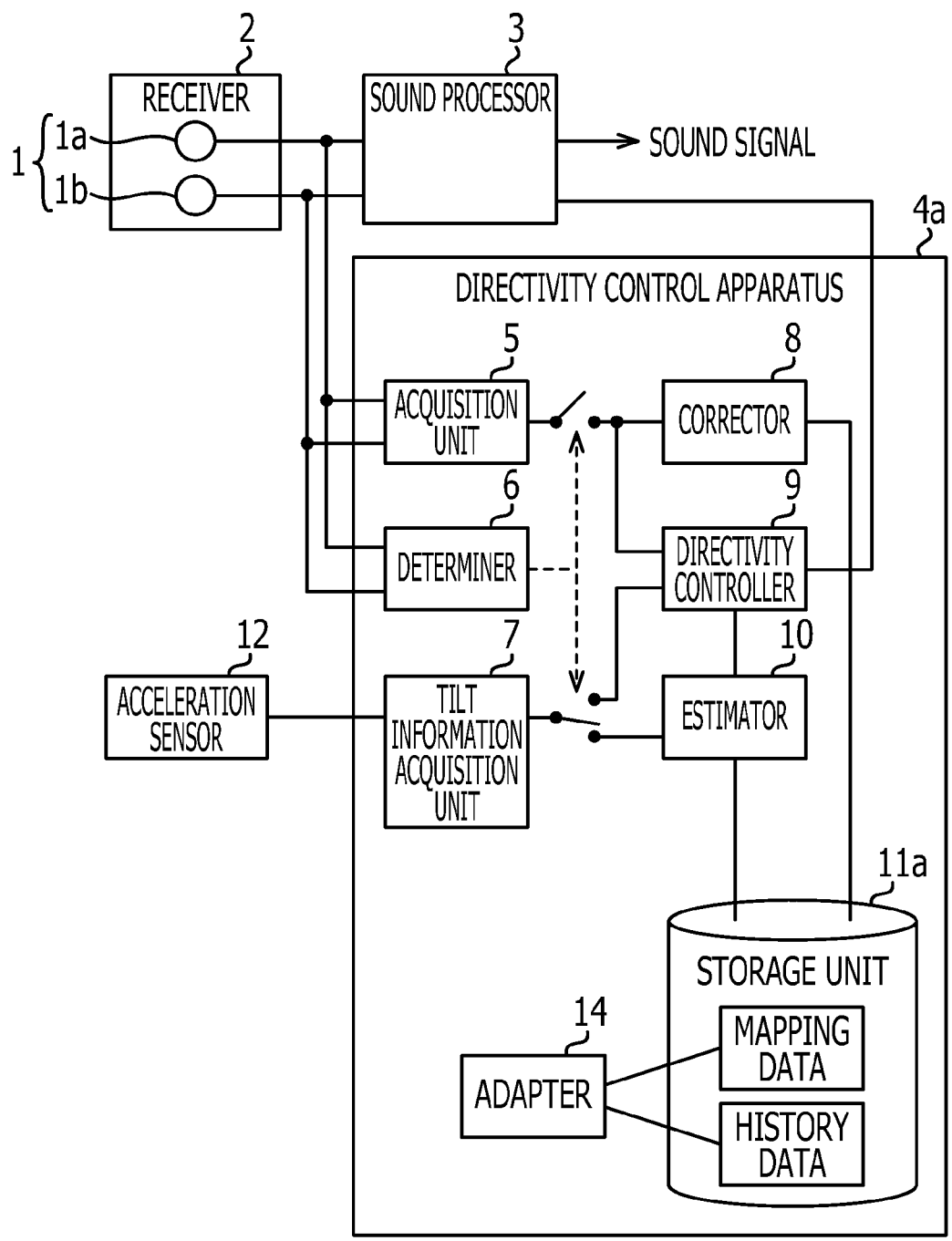
FIG. 6 is a functional block diagram of an example of a directivity control apparatus of a second embodiment.

FIG. 6 is a functional block diagram illustrating a structure of a directivity control apparatus 4a of a second embodiment. In FIG. 6, functional blocks identical to those in FIG. 1 are designated with the same reference numerals. The storage unit 11a in the directivity control apparatus 4a of FIG. 6 functions as a history recorder recording history data. The history data includes an accumulation of sets of the tilt information acquired by the tilt information acquisition unit 7 and the sound source direction information acquired at the acquisition of the tilt information. The directivity control apparatus 4a includes an adapter 14. The adapter 14 generates the mapping data based on the history data accumulated on the history data recorder. The directivity control apparatus 4a thus learns the mapping between the tilt angle and the sound source direction and generates the mapping data accounting for the actual change in the tilt angle and the sound source direction. A more appropriate sound source direction is thus estimated.

The corrector 8 maps as mapping data the incident angle $\theta_1$ as the sound source direction information output from the acquisition unit 5 to the current tilt angle $\phi_1$ as the tilt information output from the tilt information acquisition unit 7 and then stores the mapping data on the storage unit 11. While the user speaks, the corrector 8 stores information of a set of $(\theta_n, \phi_n)$ on the storage unit 11. The incident angle $\theta_n$ and the tilt angle $\phi_n$ corresponding thereto are combined as a record, and a plurality of records are recorded as history data.

The adapter 14 may generate a function representing mapping or a mapping table between the incident angle $\theta$ and the tilt angle $\phi$ based on the plurality of accumulated records. The adapter 14 calculates the mean value and the variance of samples of accumulated sets of $\theta$ and $\phi$, and adapts the function of the mapping between the incident angle of the target sound source and the tilt angle to fit the mean value or the variance. For example, the adapter 14 determines coefficients A and B of the function $\theta = A\phi + B$ representing the mapping through linear approximation of scatter diagram of the incident angle $\theta$ and the tilt angle $\phi$.

The adaptation method is not limited to the method of using the mean value or the variance. For example, the mapping between the incident angle $\theta$ of the target sound source and the tilt angle may be handled as a probability distribution based on a combination of a plurality of normal distributions. A line connecting the mean values of $\theta$ on a per tilt angle $\phi$ basis may be determined as a function representing the mapping.

The mapping data generated on the adapter 14 is recorded on the storage unit 11. If the storage unit 11 has memory space available, the adapter 14 stores mapping data each time the mapping data is generated. Alternatively, old mapping data may be replaced with new mapping data. For example, the storage unit 11 may pre-store the mapping data representing standard mapping, and if records of history data of a specific number or more are stored, the adapter 14 may generate mapping data, and substitute the generated mapping data for the pre-stored mapping data.

Figure 7:
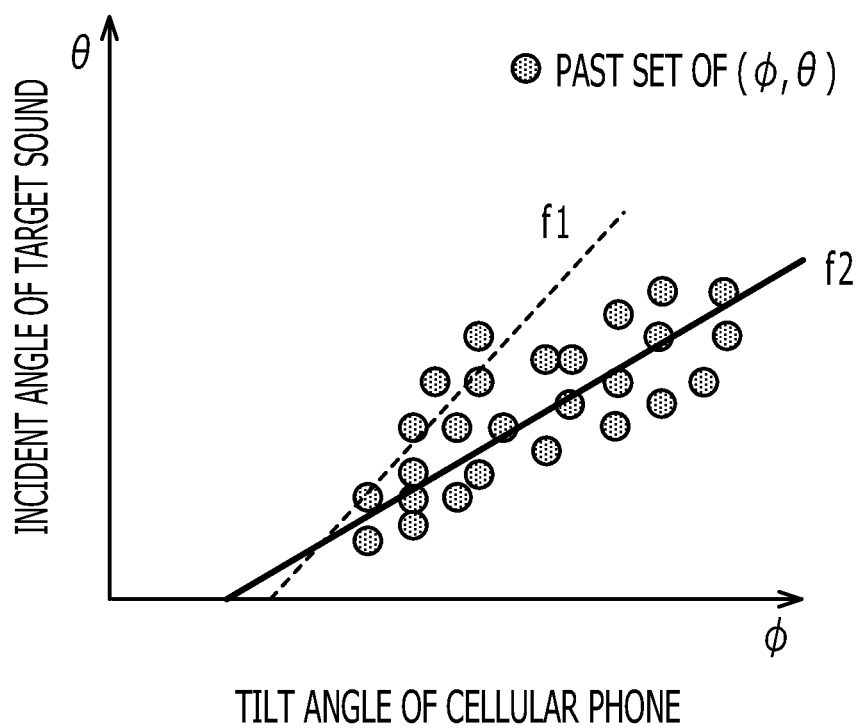
FIG. 7 is a diagram illustrating a function representing mapping.

FIG. 7 illustrates an example of the function representing the mapping generated by the adapter 14. In FIG. 7, the ordinate represents the incident angle $\theta$ of the target sound and the abscissa represents the tilt angle $\phi$ of the cellular phone. Sets of incident angles $\theta_n$ and tilt angles $\phi_n$ included in the history data are plotted on the $\phi\theta$ plane. A straight line f1 represents a function of a preset standard mapping, and a straight line f2 represents a function of the mapping determined by the adapter 14 based on the history data. The function of the straight line f2 is calculated through linear approximation of the past sets of incident angles $\theta$ and tilt angles $\phi$.

The function representing the mapping is not limited to a linear function. The function representing the mapping may be a quadratic or higher order function. Different functions may be set for different angle ranges of $\phi$. For example, a function $f_1(\phi)$ may be defined for a first range of $0<\theta<45°$ and a function $f_2(\phi)$ may be defined for a second range of $45°\leq\theta<90°$. Alternatively, no function may be used, and the mapping data may be produced as a mapping table that maps the incident angle $\theta$ to the mean value of $\phi$.

The function of the mapping between the incident angle of the target sound and the tilt angle may not be common to all people. The mapping may be different from person to person, for example, depending on the physical build and the face shape of each person and each person's manner of holding the cellular phone. According to the second embodiment, the function of the mapping between the incident angle of the target sound and the tilt angle may be adapted to each user (i.e., according to user profile). For example, each person's manner of holding the cellular phone and variations in the face shape may be adapted to the function representing the mapping based on the history of sets of the tilt angle $\phi$ of the cellular phone and the incident angle $\theta$ of the target sound. For example, sets of $\phi$ and $\theta$ of a user are learned, and the function of the mapping may be adapted to a difference in the user's manner of holding the cellular phone and the face shape of the user.

Figure 8:
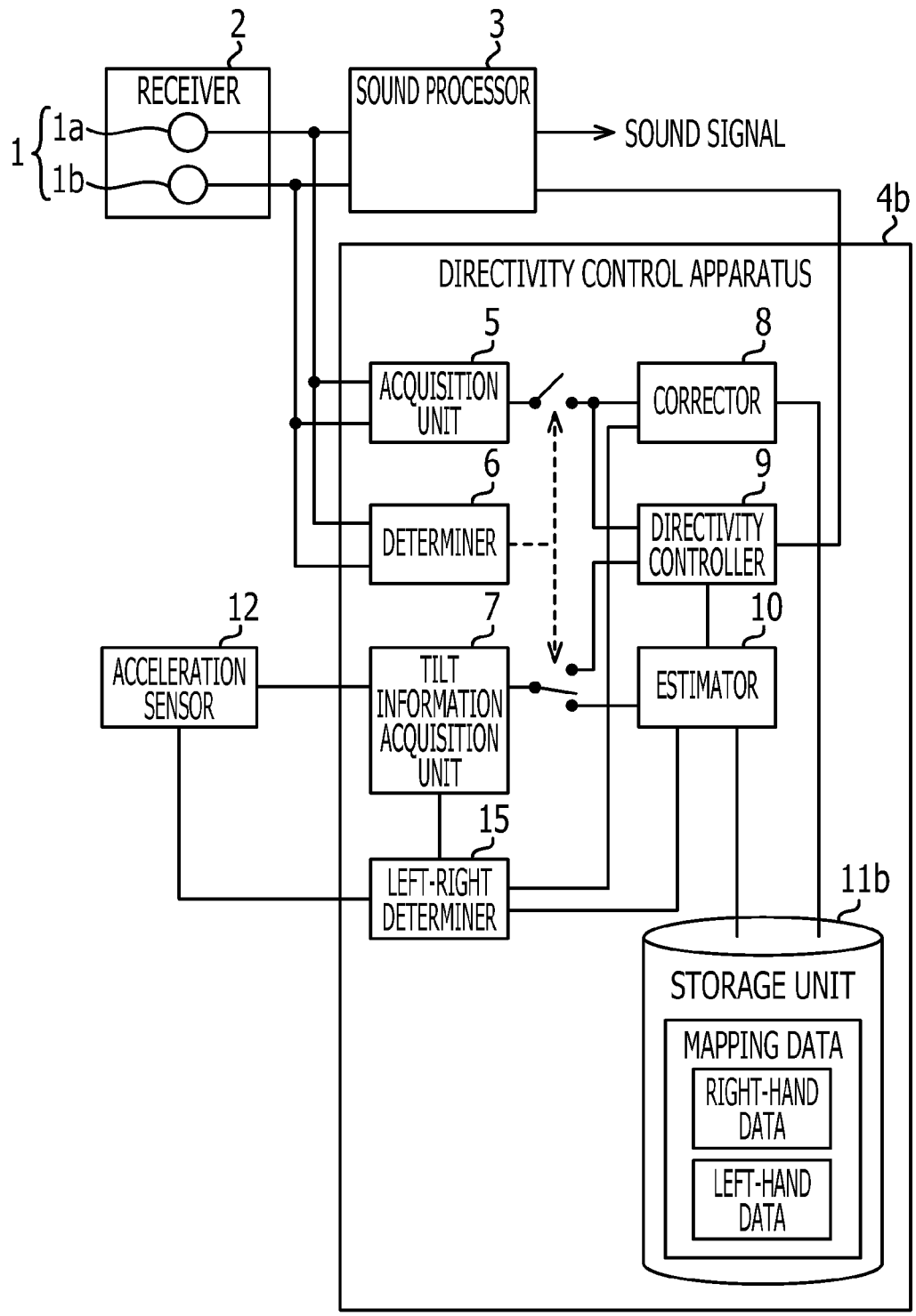
FIG. 8 is a functional block diagram of an example of the directivity control apparatus of a third embodiment.

FIG. 8 is a functional block diagram illustrating a structure of a directivity control apparatus 4b of a third embodiment. According to the third embodiment, the directivity control apparatus 4b is mounted on a cellular phone. In FIG. 8, functional blocks identical to those illustrated in FIG. 1 are designated with the same reference numerals. The directivity control apparatus 4b of FIG. 8 controls the directivity of the microphones 1a and 1b mounted on the cellular phone.

The directivity control apparatus 4b further includes a left-right determiner 15. The left-right determiner 15 determines, based on the tilt information, whether the user holds the cellular phone by their right hand or their left hand. In the directivity control apparatus 4b, the mapping data on the storage unit 11b includes right-hand data indicating the relationship between the tilt angle of the microphones 1a and 1b and the sound source direction with the cellular phone held by the right hand, and left-hand data indicating the relationship between the tilt angle of the microphones 1a and 1b and the sound source direction with the cellular phone held by the left hand.

If the left-right determiner 15 determines that the user holds the cellular phone by their right hand, the corrector 8 updates the right-hand data. If the left-right determiner 15 determines that the user holds the cellular phone by their left hand, the corrector 8 updates the left-hand data. The estimator 10 determines the sound source direction based on the right-hand data if the left-right determiner 15 determines that the user holds the cellular phone by their right hand, or determines the sound source direction based on the left-hand data if the left-right determiner 15 determines that the user holds the cellular phone by their left hand.

With this arrangement, the directivity control apparatus 4b detects whether the user holds the cellular phone by their right hand or their right hand, and controls the directivity.

Figure 9:
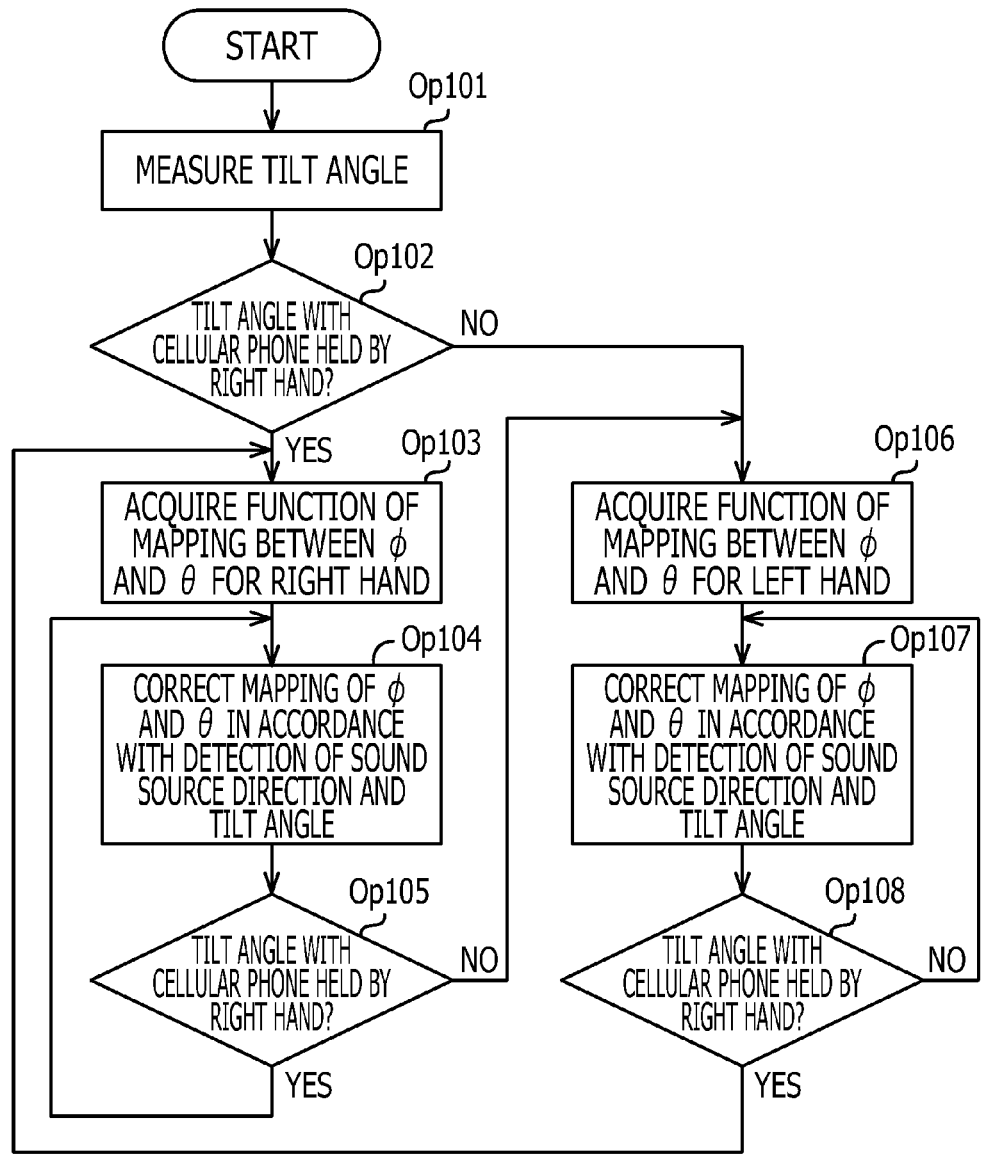
FIG. 9 is a flowchart illustrating an example of process performed by the directivity control apparatus of the third embodiment.

FIG. 9 is a flowchart illustrating a process example of the directivity control apparatus 4b of the third embodiment. As illustrated in FIG. 9, the left-right determiner 15 determines, based on the tilt angle φ determined from the information from the acceleration sensor 12, whether the user holds the cellular phone by their right hand or their left hand. The corrector 8 then switches the mapping between the sound source direction θ and the tilt angle φ.

The tilt information acquisition unit 7 acquires the tilt angle $\phi_1$ from the acceleration sensor 12 (Operation 101). The left-right determiner 15 determines, based on the tilt angle $\phi_1$, whether the user holds the cellular phone by their right hand (Operation 102). FIGS. 10A and 10B illustrate the tilt angles of the cellular phone and the mapping data with the cellular phone held by the right hand of the user and with the cellular phone held by the left hand of the user, respectively. As illustrated in FIGS. 10A and 10B, an angle of the center line of the cellular phone made with a horizontal plane is a tilt angle of the cellular phone. If the right side surface of the cellular phone is aligned with a horizontal plane with and looks downward, the tilt angle of the cellular phone is 0°.

The left-right determiner 15 determines that the cellular phone is held by the right hand if the tilt angle φ falls within a range of −90° to +90°, and determines that the cellular phone is held by the left hand if the tilt angle φ falls within a range of 90° to 270°. The left-right determiner 15 has difficulty in determining whether the cellular phone is held by the right hand or the left hand if the tilt angle φ is about 90° or about −90°. In such a case, the directivity control process of the microphone array 1 may be suspended until the left-right determiner 15 has determined whether the cellular phone is held by the right hand or the left hand.

A straight line f1 in the graph in the lower portion of FIG. 10A is an example of the function representing the mapping of the right hand. A straight line f2 in the graph in the lower portion of FIG. 10B is an example of the function representing the mapping of the left hand. The right-hand data represents the function of the mapping with the tilt angle φ falling within the angular range of the right hand (for example, −90° to 90°). The left-hand data represents the function of the mapping with the tilt angle φ falling within the angular range of the left hand (for example, 90° to 270°).

If the left-right determiner 15 determines that the cellular phone is held by the right hand (yes from Operation 102), the corrector 8 acquires from the storage unit 11 the mapping data of φ and θ for the right hand (Operation 103). The corrector 8 then corrects the mapping data of φ and θ for the right hand based on the incident angle $f_1$ acquired from the acquisition unit 5 and the tilt angle $\phi_1$ acquired from the tilt information acquisition unit 7 (Operation 104).

The left-right determiner 15 measures a tilt angle $\phi_2$ and determines whether the tilt angle $\phi_2$ is a tilt angle of the cellular phone held by the right hand (Operation 105). If the tilt angle $\phi_2$ is a tilt angle of the cellular phone held by the right hand, processing returns to Operation 104. If the tilt angle $\phi_2$ is not a tilt angle of the cellular phone held by the right hand, the corrector 8 acquires the function of the mapping of φ and θ for the left hand (Operation 106).

If it is determined in Operation 102 that the cellular phone is held by the left hand, the corrector 8 also acquires the function of the mapping of φ and θ for the left hand (Operation 106). The corrector 8 corrects the mapping of φ and θ based on the sound source direction detected by the acquisition unit 5 (for example, an incident angle $\theta_2$) and the tilt angle $\phi_2$ from the tilt information acquisition unit 7. The left-right determiner 15 measures a tilt angle $\phi_3$ and determines whether the tilt angle $\phi_3$ is a tilt angle of the cellular phone held by the right hand (Operation 108). If the tilt angle $\phi_3$ is a tilt angle of the cellular phone held by the right hand, processing returns to Operation 103. If the tilt angle $\phi_3$ is a tilt angle of the cellular phone held by the left hand, processing returns to Operation 107. The process described heretofore is repeated until a communication session is completed.

The process example of FIG. 9 is performed by the left-right determiner 15 and the corrector 8. In a process similar to the process of FIG. 9, the left-right determiner 15 may determine whether the cellular phone is held by the right hand or the left hand of the user, and the estimator 10 may switch the mapping data for the estimation of the sound signal between the right hand holding case and the left hand holding case. For example, Operations 103 and 104 may be replaced with the estimation process of the sound source direction, in which the estimator 10 estimates the sound source direction in response to the tilt angle $\phi_1$ acquired from the tilt information acquisition unit 7 based on the mapping data for the right hand. In this case, Operation 106 and 107 may be replaced with the estimation process of the sound source direction, in which the estimator 10 estimates the sound source direction based on the mapping data for the left hand. The corrector 8 and the estimator 10 may switch the operations thereof in response to the determination results of the left-right determiner 15. Alternatively, at least one of the corrector 8 and the estimator 10 may switch the operation thereof in response to the determination results the left-right determiner 15.

Figure 11:
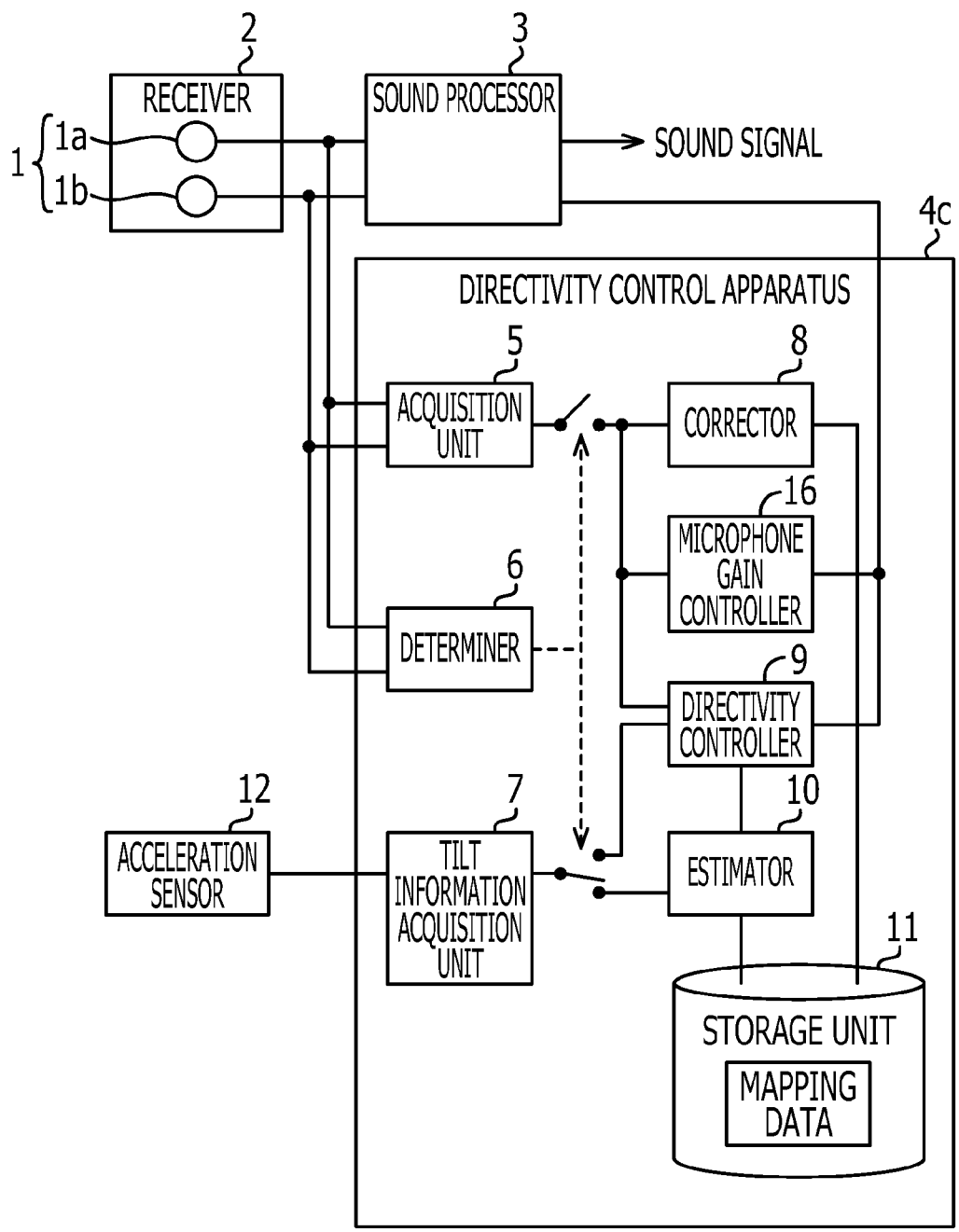
FIG. 11 is a functional block diagram of an example of a directivity control apparatus of a fourth embodiment.

FIG. 11 is a functional block diagram illustrating a structure of a directivity control apparatus 4c of a fourth embodiment. According to the fourth embodiment, the directivity control apparatus 4c is mounted on a cellular phone. In FIG. 11, functional blocks identical to those illustrated in FIG. 1 are designated with the same reference numerals. The directivity control apparatus 4c of FIG. 11 controls the directivity of the microphones 1a and 1b mounted on the cellular phone.

The directivity control apparatus 4c further includes a microphone gain controller 16. In response to the sound source direction information acquired by the acquisition unit 5, the microphone gain controller 16 adjusts gain of amplification of an sound signal input from the microphones 1a and 1b and thus controls the volume of the sound output from the microphones 1a and 1b. The volume of the microphone is thus adjusted in response to a change in the relative positional relationship between the mouth of the user talking over the cellular phone and the microphones 1a and 1b.

The microphone gain controller 16 measures the distance between the mouth and the microphones 1a and 1b based on the value of the incident angle θ to the mouth. Upon determining that the mouth is spaced apart from the microphones 1a and 1b, the microphone gain controller 16 increases the gain of the microphones 1a and 1b. Optionally, the microphone gain controller 16 may be arranged between the directivity controller 9 and the sound processor 3.

Figure 12:
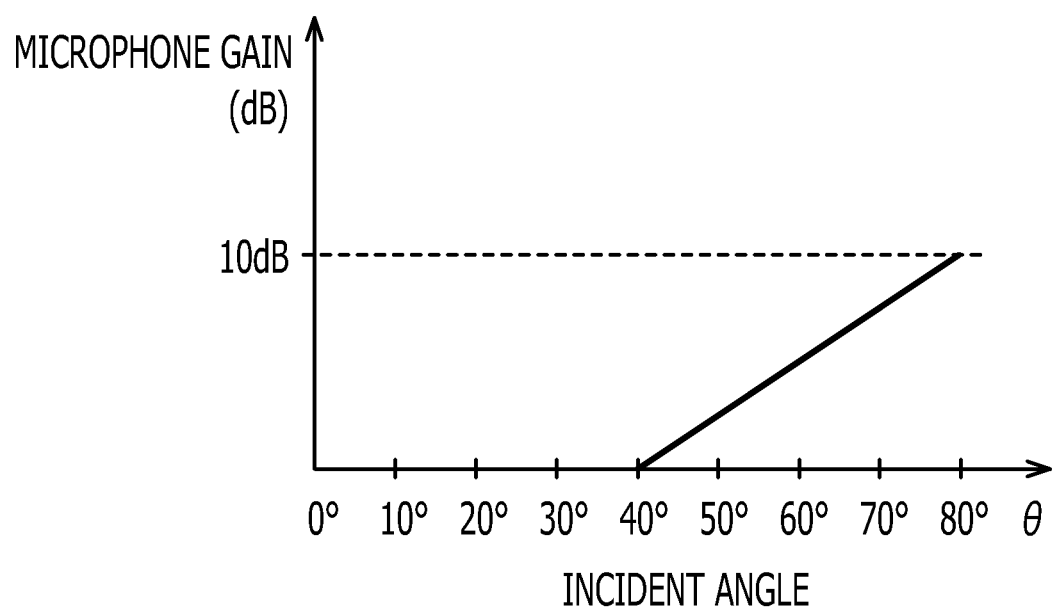
FIG. 12 is a diagram illustrating an example of a relationship between an incident angle θ and microphone gain.

FIG. 12 illustrates an example of the relationship between the incident angle θ and the gain of the microphone. In FIG. 12, the ordinate represents the microphone gain and the abscissa represents the incident angle θ of the target sound. If the incident angle θ is smaller than a specific threshold value (40°, for example), the microphone gain remains unchanged. If the incident angle θ is above the threshold value, the microphone gain increases. When the distance between the mouth and the microphone is short with the incident angle θ within a small range, increasing the microphone gain is not necessary. If the incident angle θ is large, the cellular phone is held in a nearly vertical position, and the distance between the mouth and the microphone increases. If the incident angle θ is large, the microphone gain is increased in order to prevent the sound output from the microphone from being lowered in volume. The microphone gain controller 16 increases the volume of the sound output from the microphone array 1 to a level that allows the voice to be heard.

Figure 13:
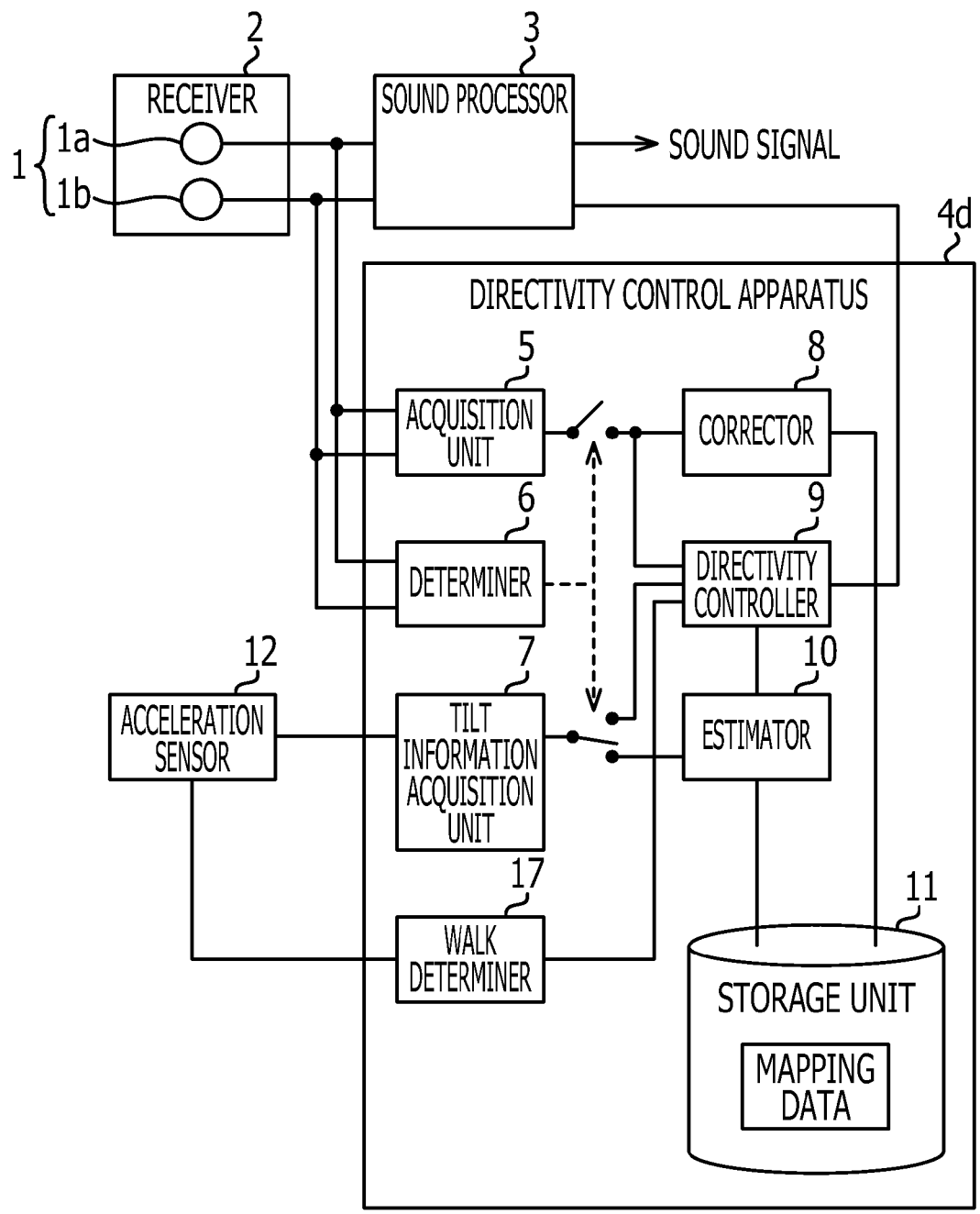
FIG. 13 is a functional block diagram of an example of a directivity control apparatus of a fifth embodiment.

FIG. 13 is a functional block diagram illustrating a structure of a directivity control apparatus 4d of a fifth embodiment. According to the fifth embodiment, the directivity control apparatus 4d is mounted on a cellular phone. In FIG. 13, functional blocks identical to those illustrated in FIG. 1 are designated with the same reference numerals. The directivity control apparatus 4d of FIG. 13 controls the directivity of the microphones 1a and 1b mounted on the cellular phone.

The directivity control apparatus 4d includes a walk determiner 17. The walk determiner 17 detects the motion of the cellular phone and determines whether the user holding the cellular phone is walking. The walk determiner 17 may determine whether the user is walking, by comparing acceleration detected by the acceleration sensor 12 with a pattern of prerecorded acceleration. That determination process may be performed on a technique of a pedometer including an acceleration sensor. The method of detecting the motion of the cellular phone is not limited to the acceleration sensor technique, and any technique can be used. For example, the walking motion may be detected by using a pendulum connected to an elastic body such as a spring. Optionally, the acceleration sensor of a pedometer pre-installed on the cellular phone may be used.

The directivity controller 9 widens the directivity if the walk determiner 17 determines that the user is walking. The directivity widening processes may include a process of widening the incident angle of a selectively extracted sound, and a process of narrowing a range of suppression of noise. The structure of FIG. 13 causes the directivity to be widened or narrowed depending on whether the user is walking or not.

Figure 14:
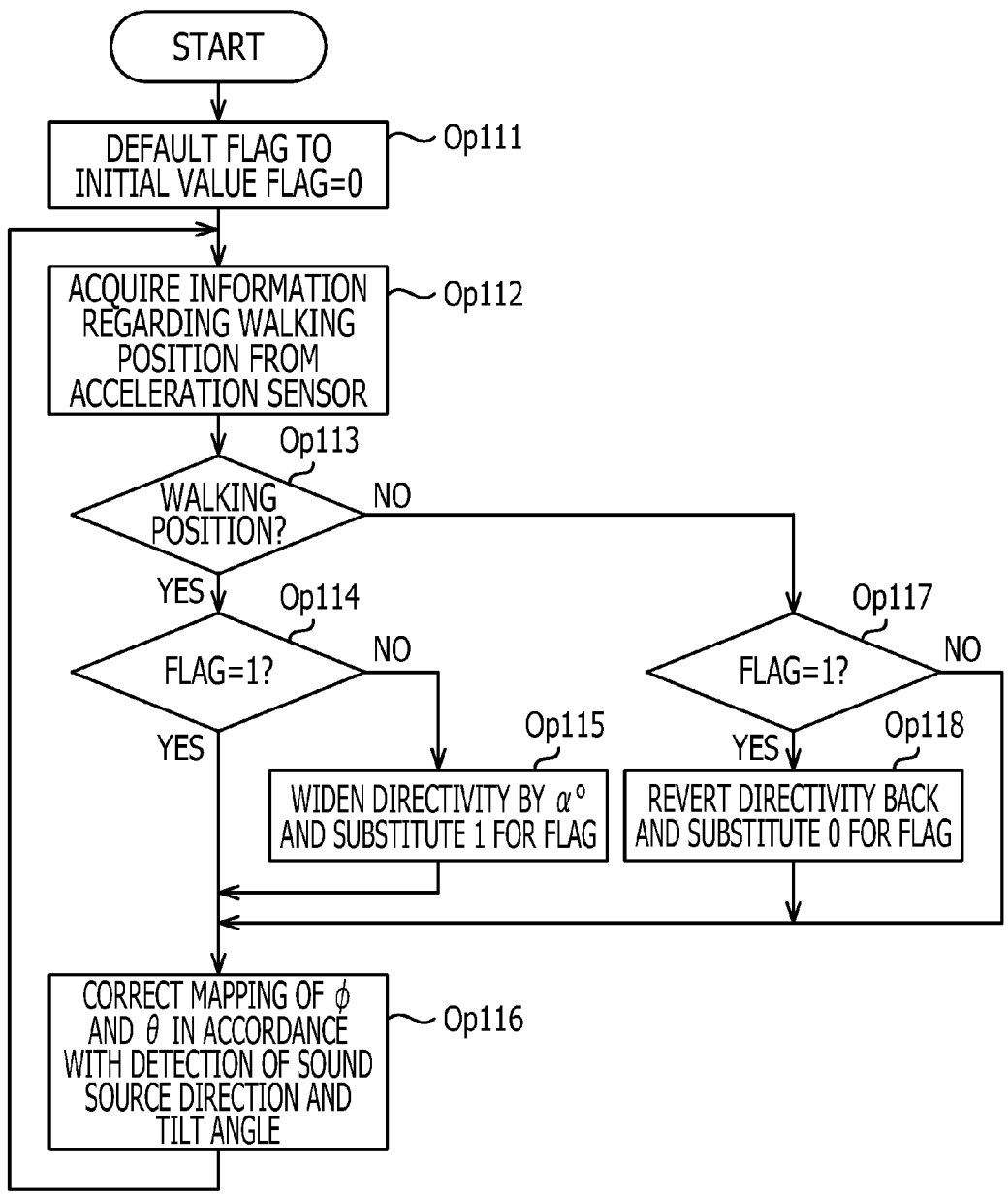
FIG. 14 is a flowchart illustrating a control process of the directivity control apparatus that controls the directivity by determining whether the user is walking or not.

FIG. 14 is a flowchart illustrating a control process of the directivity performed depending on the determination of whether the user is walking or not. A flag in FIG. 14 indicates whether the directivity of the microphone is widened by α° (flag=1) or not (flag=0).

The directivity control apparatus 4d initializes the flag (flag=0) to set the unwidened state of directivity of the microphone as an initial state (Operation 111). The walk determiner 17 acquires, from information from the acceleration sensor 12, information as to walking position (Operation 112). The directivity controller 9 switches the process thereof in response to the walking position or non-walking position (Operation 113).

If the user is in the walking position (yes from Operation 113), the directivity controller 9 determines whether the directivity is widened, i.e., whether the value of the flag is "1" (Operation 114). If the flag is not at "1," the directivity controller 9 widens the directivity of the microphone array 1 by α° and then substitutes for "1" for the flag (Operation 115).

The widening of the directivity at α° may be performed by widening each of the two sides of a reception polar pattern by a constant angle (10° for example). This method prevents the walking of the user from shifting the position of the mouth from the reception pattern. If the flag is "1," the directivity is already widened, and the directivity controller 9 does nothing particular. In Operation 116, the corrector 8 corrects the mapping between φ and θ in accordance with the sound source direction and the tilt information. The correction process is identical to the correction process previously discussed with reference to the first through fourth embodiments. Processing then returns to Operation 112.

If it is determined in Operation 13 that the user is not in the walking position (no from Operation 13), the directivity controller 9 determines whether the value of the flag is "1" (Operation 117). If the flag is at "1," the directivity controller 9 sets the α°-widened directivity to the original directivity and substitutes "0" for the flag (Operation 118). Processing proceeds to Operation 116. If the flag is at "0," processing returns to Operation 116.

According to the fifth embodiment, the directivity control apparatus 4d is provided with a sufficient margin in the directivity reception pattern. Even if the user's walking position greatly changes the relationship between the directivity and the mouth, the directivity control apparatus 4d prevents the mouth from shifting the reception pattern. In other words, communications are maintained with the voice not suppressed even if the user is in the walking position that tends to cause a change in the positional relationship between the mouth and the microphone.

Figure 15:
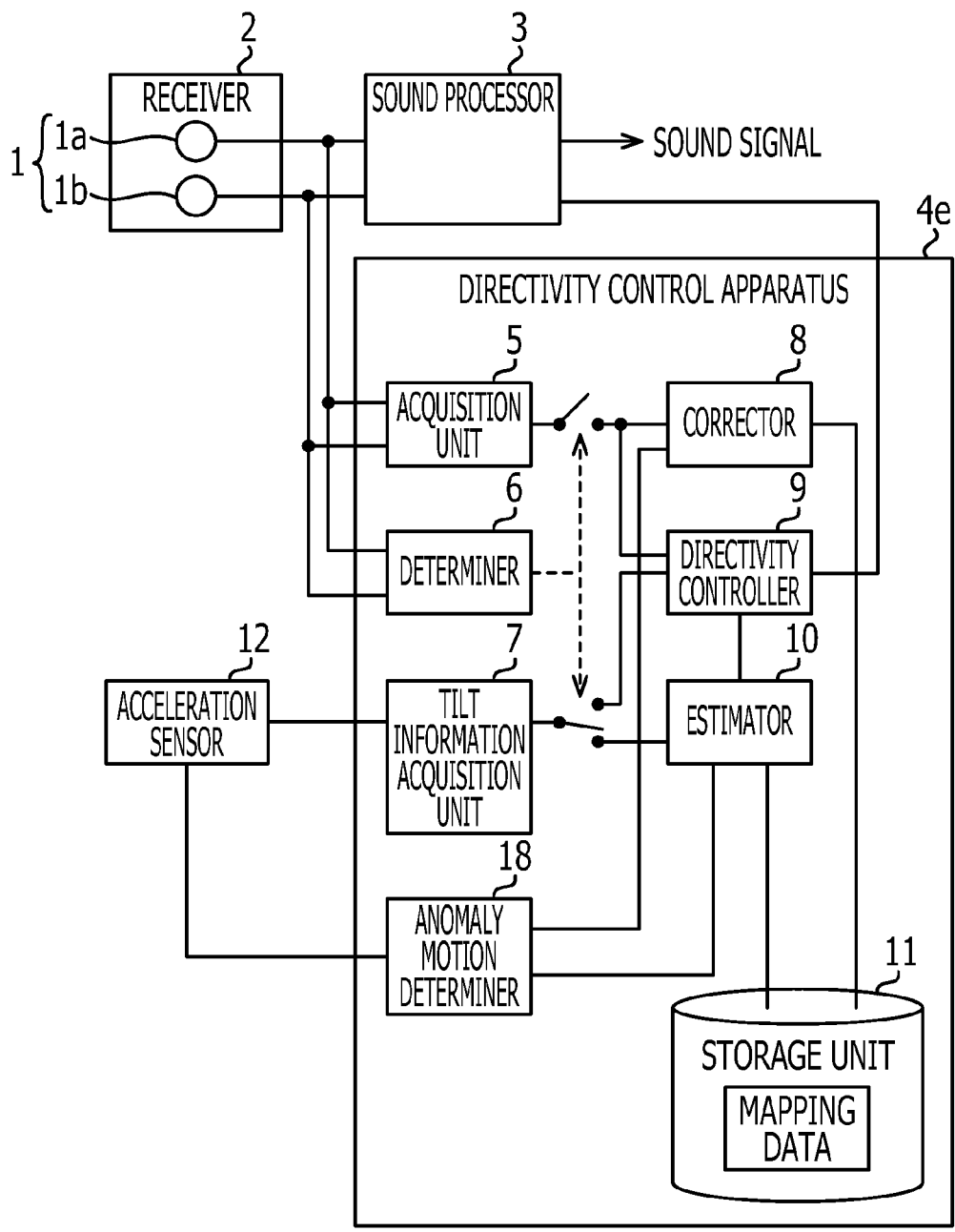
FIG. 15 is a functional block diagram of an example of a directivity control apparatus of a sixth embodiment.

FIG. 15 is a functional block diagram illustrating a structure of a directivity control apparatus 4e of a sixth embodiment. According to the sixth embodiment, the directivity control apparatus 4e is mounted on a cellular phone. In FIG. 15, functional blocks identical to those illustrated in FIG. 1 are designated with the same reference numerals. The directivity control apparatus 4e of FIG. 15 controls the directivity of the microphones 1a and 1b mounted on the cellular phone.

The directivity control apparatus 4e further includes an anomaly motion determiner 18. The anomaly motion determiner 18 detects the motion of the cellular phone and determines whether the motion of the cellular phone is abnormal. For example, the anomaly motion determiner 18 determines whether the motion is abnormal, by comparing the acceleration detected by the acceleration sensor 12 with the pre-recorded acceleration pattern.

If the acceleration sensor 12 detects an impact stronger than a specific value, the anomaly motion determiner 18 determines that an anomaly motion has taken place. For example, the cellular phone may drop down or the user talking over the cellular phone may run into another person. For example, if a change pattern in the acceleration detected by the acceleration sensor 12 is sharper than a change pattern in the walking motion (a change in the acceleration is larger than in the walking position), the user may possibly run up or down steps. If the tilt angle of the cellular phone indicates that the cellular phone remains lying on one side thereof for a constant period of time, the user may talk over the cellular phone put on the top of a desk.

If the anomaly motion determiner 18 determines that the motion of the cellular phone is abnormal, the directivity controller 9 may widen the directivity. The directivity widening process may be performed in the same manner as in the fifth embodiment. If the anomaly motion determiner 18 determines that the motion of the cellular phone is abnormal, the corrector 8 may keep the mapping data from being updated.

One or both of the processes of the corrector 8 and the directivity controller 9 may be performed.

According to the sixth embodiment, the directivity control apparatus 4e is provided with a sufficient margin in the directivity reception pattern. Even if an anomaly motion is detected during communication, e.g., the user may drop down the cellular phone or the cellular phone may hit something, the directivity control apparatus 4e prevents the reception pattern from shifting the mouth. In other words, communications are maintained with the voice not suppressed even if the user is in an anomaly motion that may cause a change in the positional relationship between the mouth and the microphone. The voice of the user is not suppressed and erratic direction estimation due to noise is prevented.

Figure 16:
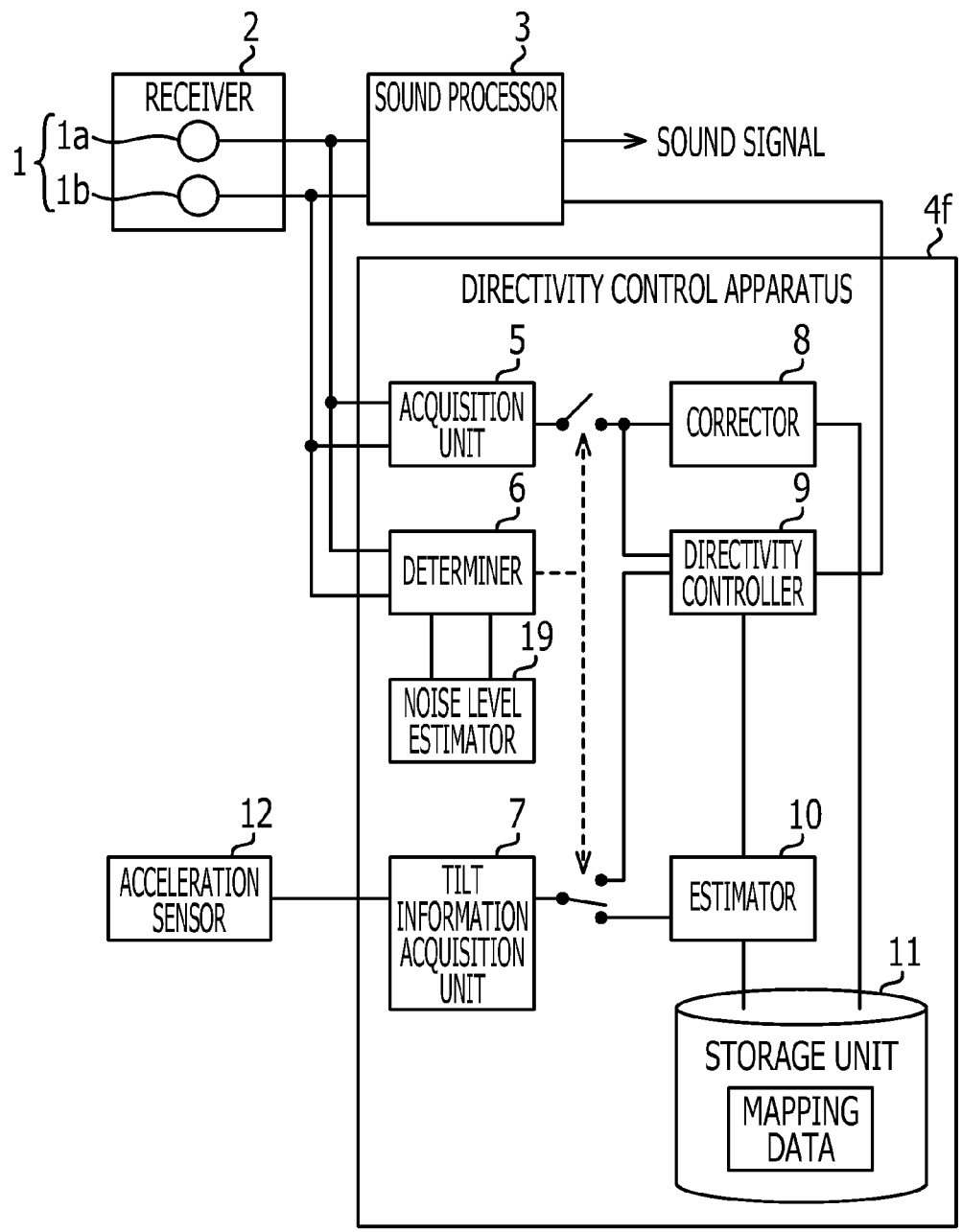
FIG. 16 is a functional block diagram of an example of a directivity control apparatus of a seventh embodiment.

FIG. 16 is a functional block diagram illustrating a structure of a directivity control apparatus 4f of a seventh embodiment. According to the seventh embodiment, the directivity control apparatus 4f is mounted on a cellular phone. In FIG. 16, functional blocks identical to those illustrated in FIG. 1 are designated with the same reference numerals.

The directivity control apparatus 4f includes a noise level estimator 19 estimating a background noise level. If the noise level estimated by the noise level estimator 19 is above a threshold value, the directivity controller 9 controls the directivity of the microphones 1a and 1b in response to the sound source direction, based on the mapping data on the storage unit 11. The sound source direction is estimated by the estimator 10 that estimates the sound source direction of the sound source responsive to the tilt information acquired by the tilt information acquisition unit 7.

According to the seventh embodiment, if the determiner 6 determines that the target sound has not been detected, and/or that the background noise level is high, the estimator 10 determines, based on the mapping data, the direction to the sound source responsive to the tilt information acquired by the tilt information acquisition unit 7.

The noise level estimator 19 estimates the background noise level based on the information of the sound signal input to the determiner 6. If the background noise level is above a threshold value, the target sound detection is difficult and the noise level estimator 19 determines that the background noise level is too high. For example, a noise level of 80 to 90 dBA typical of a highly noisy environment may be set for the threshold value of the background noise level. The background noise level may be estimated by calculating the time average of power of a sound signal during a frame that is determined as that the user is not talking. The method of estimating the background noise level is not limited to that method. Another method of estimating the background noise level may be used.

According to the seventh embodiment, the directivity control apparatus 4f estimates the background noise level. If the background noise level rises above the threshold value, the directivity control apparatus 4f estimates the direction to the mouth based on the mapping data that matches coordinates values of the current tilt angle φ of the cellular phone and coordinate values of the incident angle θ to the mouth. The directivity control apparatus 4f thus controls the directivity of the microphone array 1.

The first through seventh embodiments are not limited to the cellular phone but are also applicable to other devices including a device having a microphone function, such as a personal digital assistant (PDA), a game playing machine, a global positioning system (GPS) device, a car navigation system, and a car-mounted telephone. An electronic device such as a portable device including the directivity control apparatus also falls within the scope of the invention. A combination of at least two of the above-described embodiments also falls within the invention. According to an aspect of an embodiment of the invention, the directivity controller 9 performs a control operation for information to the sound processor according to user profile and/or user context (e.g., walking, moving, etc) for the sound processor 3.

According to the embodiments, a computer as a hardware structure includes a central processing unit (CPU), a read-only memory (ROM), a random-access memory (RAM), and an input-output unit, interconnected to each other via a bus. The ROM stores a program the CPU uses to control the computer. The CPU reads the program stored on the ROM, and performs a process under the control of the read program. The RAM stores data the CPU uses for arithmetic calculation, and data as arithmetic calculation results. The input-output unit receives an operation input entered by a user, and then outputs the operation input to the CPU. The input-output unit outputs an instruction signal output from the CPU to a network interface. The network interface transmits the instruction signal output from the CPU to another computer via a network. The functional blocks of the directivity control apparatuses illustrated in FIGS. 1, 6, 8, 11, 13, 15, and 16 may be implemented in a process of the CPU that executes the program. Whole or part of the process may be implemented in a hardware structure such as a logic circuit. Part of the program may be implemented in an operating system (OS).

The embodiments can be implemented in computing hardware (computing apparatus/machine) and/or software, such as (in a non-limiting example) any computer that can store, retrieve, process and/or output data and/or communicate with other computers. The results produced can be output to an output device, for example, displayed on a display of the computing hardware. A program/software implementing the embodiments may be recorded on computer-readable media comprising computer-readable recording media. The program/software implementing the embodiments may also be transmitted over transmission communication media or path, e.g., a wire and/or a wireless network implemented via hardware. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of transmission communication media includes a carrier-wave signal. The media described above may be non-transitory media.

According to an aspect of the embodiments of the invention, any combinations of one or more of the described features, functions, operations, and/or benefits can be provided. A combination can be one or a plurality. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A directivity control apparatus, comprising:
a processor; and
a memory which stores a plurality of instructions, which when executed by the processor, cause the processor to execute:
acquiring tilt information indicating a tilt angle of a casing of the directivity control apparatus from a sensor measuring the tilt angle of the casing;
acquiring sound source direction information indicating a direction to a sound source, based on sound information picked up by at least two microphones arranged on the casing;
updating, on basis of the sound source direction information and the tilt information, stored mapping data indicating a relationship between the tilt angle of the casing and the direction to the sound source with respect to the microphone, if determined that the sound information indicates a target sound;
upon determining that the sound information does not indicate a target sound, estimating on basis of a plurality of mapping data a direction to a sound source responsive to the acquired tilt information; and
adjusting on basis of sound source direction information a directivity of a microphone.

2. The directivity control apparatus according to claim 1, wherein the estimating estimates a direction to the sound source responsive to the tilt information, based on the plurality of mapping data if determined that the sound information does not indicate the target sound and if the tilt information has changed in a direction that the tilt angle of the casing increases.

3. The directivity control apparatus according to claim 1, wherein the adjusting maintains a directivity of a microphone if determined that the sound information does not indicate the target sound and if the tilt information has changed in a direction that the tilt angle of the casing decreases, and
wherein the updating corrects the mapping data in response to a change in the tilt angle if determined that the sound information does not indicate the target sound and if the tilt information has changed in a direction that the tilt angle of the casing decreases.

4. The directivity control apparatus according to claim 1, wherein the processor further executes:
recording history data including an accumulation of sets of the acquired tilt information and the acquired sound source direction information at a time of acquisition of the tilt information; and
determining a function, representing mapping of the tilt information and the sound source direction information, based on the history data if the recorded history data is accumulated above a specific number of units of history data, and generates the mapping data based on the function.

5. The directivity control apparatus according to claim 1, wherein the processor further executes:
estimating a background noise level;
wherein the estimating estimates a direction to the sound source responsive to the acquired tilt information, based on the plurality of mapping data if the background noise level is above a threshold value, and
wherein the adjusting controls a directivity of a microphone in response to the estimated direction to the sound source if the background noise level is above the threshold value.

6. The directivity control apparatus according to claim 1 further comprising:
wherein the casing includes a cellular phone,
wherein the directivity control apparatus further comprises a left-right determiner to determine in response to the tilt information whether the cellular phone is held by a right hand or a left hand of a user,
wherein the mapping data includes right-hand data indicating a relationship between the tilt angle of the casing and the sound source direction with the cellular phone held by the right hand of the user, and left-hand data indicating a relationship between the tilt angle of the casing and the sound source direction with the cellular phone held by the left hand of the user,
wherein the updating updates the right-hand data if the left-right determiner determines that the user holds the cellular phone by the right hand, or updates the left-hand data if the left-right determiner determines that the user holds the cellular phone by the left hand, and
wherein the estimating estimates a sound source direction based on the right-hand data if the left-right determiner determines that the user holds the cellular phone by the right hand, or estimates a sound source direction based on the left-hand data if the left-right determiner determines that the user holds the cellular phone by the left hand.

7. The directivity control apparatus according to claim 1, wherein the casing comprises a cellular phone,
wherein the directivity control apparatus further comprises:
a walk determiner to determine, by detecting a motion of the cellular phone, whether the user holding the cellular phone is walking, and
wherein the adjusting widens a directivity of a microphone if the walk determiner determines that the user is walking.

8. The directivity control apparatus according to claim 1, further comprising:
a microphone gain controller to control a volume level of a sound output by a microphone based on the acquired sound source direction information.

9. The directivity control apparatus according to claim 1, wherein the casing comprises a cellular phone,
wherein the directivity control apparatus further comprises:
an anomaly motion determiner to determine, by detecting a motion of the cellular phone, whether the motion of the cellular phone is abnormal, and
wherein the updating does not update the mapping data if the anomaly motion determiner determines that the motion of the cellular phone is abnormal.

10. The directivity control apparatus according to claim 9, wherein the adjuster widens a directivity of a microphone if the anomaly motion determiner determines that the motion of the cellular phone is abnormal.

11. A portable device, comprising:
a directivity-controllable microphone;
a sensor to detect a motion of the portable device;
a processor to execute:
acquiring tilt information indicating a tilt angle of the portable device from the motion of the portable device detected by the sensor;

calculating sound source direction information indicating a direction to a sound source of a target sound based on sound information acquired by the microphone;

updating, on basis of the sound source direction information and the tilt information, stored mapping data indicating a relationship between the tilt angle of the casing and the direction to the sound source with respect to the microphone, if determined that the acquired sound information indicates a target sound;

upon determining that the sound information does not indicate a target sound, estimating on basis of a plurality of mapping data a direction to the sound source responsive to the tilt information; and adjusting on basis of sound source direction information a directivity of the microphone.

12. A non-transitory computer-readable medium for recording a program allowing a computer to execute:

acquiring tilt information indicating a tilt angle of a casing of a computer from a sensor measuring the tilt angle of the casing of the computer;

acquiring sound source direction information indicating a direction to a sound source, based on sound information picked up by a microphone arranged on the casing;

determining whether the sound information indicates a target sound;

correcting mapping data by accessing a recorder recording the mapping data indicating a relationship between the tilt angle of the casing and the direction to the sound source with respect to the microphone if the sound information is determined as indicating the target sound;

upon determining that the sound information does not indicate a target sound, estimating on basis of a plurality of mapping data a direction to the sound source responsive to the tilt information acquired; and controlling a directivity of the microphone on basis of sound source direction information.

13. The non-transitory computer-readable medium according to claim 12, wherein the estimating comprises estimating a direction to the sound source responsive to the tilt information, based on the plurality of mapping data if the sound information is determined as not indicating the target sound in the determining and if the tilt information has changed in a direction that the tilt angle of the casing increases.

14. The non-transitory computer-readable medium according to claim 12, wherein the controlling of the directivity comprises maintaining a directivity of the microphone if the sound information is determined as not indicating the target sound in the determining and if the tilt information has changed in a direction that the tilt angle of the casing decreases, and wherein the correcting comprises correcting the mapping data in response to a change in the tilt angle if the sound information is determined as not indicating the target sound in the determining and if the tilt information has changed in a direction that the tilt angle of the casing decreases.

15. A method of controlling a directivity of a microphone executed by a computer, comprising:

acquiring tilt information indicating a tilt angle of a casing of a computer from a sensor measuring the tilt angle of the casing of the computer;

acquiring sound source direction information indicating a direction to a sound source, based on sound information picked up by a microphone arranged on the casing;

correcting mapping data by accessing a recorder recording the mapping data indicating a relationship between the tilt angle of the casing and the direction to the sound source with respect to the microphone if the sound information is determined as indicating a target sound;

upon determining that the sound information does not indicate a target sound, estimating on basis of a plurality of mapping data estimating a direction to the sound source responsive to the tilt information acquired; and controlling a directivity of the microphone on basis of sound source direction information.

16. The method according to claim 15, wherein the estimating comprises estimating a direction to the sound source responsive to the tilt information, based on the plurality of mapping data if the sound information is determined as not indicating the target sound in the determining and if the tilt information has changed in a direction that the tilt angle of the casing increases.

17. The method according to claim 15, wherein the controlling of the directivity comprises maintaining a directivity of the microphone if the sound information is determined as not indicating the target sound in the determining and if the tilt information has changed in a direction that the tilt angle of the casing decreases, and wherein the correcting comprises correcting the mapping data in response to a change in the tilt angle if the sound information is determined as not indicating the target sound in the determining and if the tilt information has changed in a direction that the tilt angle of the casing decreases.

18. A portable device, comprising:

a directivity-controllable microphone;

a sensor to detect a motion of the portable device;

a computer processor capable of executing:

acquiring tilt information indicating a tilt angle of the portable device from the motion of the portable device detected by the sensor;

calculating sound source direction information indicating a direction to a sound source for determining a target sound based on sound information acquired by the microphone;

maintaining mapping data indicating a relationship between the tilt angle of the portable device and the direction to the sound source with respect to the microphone;

estimating based on a plurality of mapping data a direction to the sound source responsive to the tilt information, if the acquired sound information does not indicate a target sound, and adjusting a directivity of the microphone based on the estimated direction to the sound source.

* * * * *